RE 24292

United States Patent Office 2,739,964
Patented Mar. 27, 1956

2,739,964

NON-IONIZED CYANINE DYES

Leslie G. S. Brooker and Frank L. White, Rochester, N. Y., assignors to Eastman Kodak Company, Rochester, N. Y., a corporation New Jersey No Drawing. Application August 19, 1953, Serial No. 375,279

12 Claims. (Cl. 260—240.1)

This invention relates to non-ionized dyes, and in particular, trinuclear dyes which contain no acid anion, such as iodide, chloride, etc.

This application is a continuation-in-part of our application Serial No. 282,696, filed April 16, 1952 (now abandoned).

Trinuclear dyes of the cyanine type have long been known and more recently cyanine dyes of the carbocyanine type having a pyrazolyl group in the meso-position have been described. See, for example, Kendall and Fry U. S. Patent 2,385,815, issued October 2, 1945.

We have now found a new class of cyanine dyes which can advantageously be used as optical sensitizers for photographic silver halide emulsions. The new cyanine dyes of our invention do not contain the conventional acid anions, such as chloride, iodide, etc. and we have accordingly designated these new dyes as non-ionized dyes. These new dyes cannot be precipitated by the usual anions.

The new non-ionized dyes of our invention can be represented by the following general formula:

I.

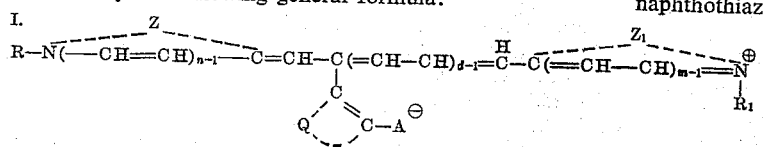

wherein R and $R_1$ each represents an alkyl group, i. e. an alcohol radical, e. g. methyl, ethyl, n-propyl, n-butyl isobutyl, n-amyl, isoamyl, β-hydroxyethyl, γ-hydroxypropyl, β-methoxyethyl, β-ethoxyethyl, allyl, benzyl (phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β-carbomethoxyethyl, carbethoxymethyl, β-carbethoxyethyl, etc., A represents a sulfur atom or an oxygen atom, Q represents the non-metallic atoms necessary to complete a heterocyclic nucleus containing from 5 to 6 atoms in the heterocyclic ring, such as those of the pyrazolone series (e, g. 3-methyl-1-phenyl-5-pyrazolone, 1-phenyl-5-pyrazolone, 1-(2-benzothiazolyl-3-methyl-5-pyrazolone, etc.,), those of the isoxazolone series (e. g. 3-phenyl-5-(4H)-isoxazolone, 3-methyl-5-(4H)-isoxazolone, etc.), those of the indandione series (e. g. 1,3-diketohydrindene, etc.), those of the oxindole series, (e. g. 1-alkyl-2,3-dihydro-2-oxindoles, etc.), those of the 2,4,6-triketohexahydropyrimidine series (e. g. barbituric acid or 2-thiobarbituric acid as well as their 1-alkyl (e. g. 1-methyl, 1-ethyl, 1-n-propyl, 1-n-heptyl, etc.), or 1,3-dialkyl (e. g. 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e. g. 1,3-diphenyl, 1,3-di(p-chlorophenyl), 1,3-di(p-ethoxycarbonylphenyl), etc.), or 1-aryl (e. g. 1-phenyl, 1-p-chlorophenyl, 1-p-ethoxycarbonylphenyl), etc.) or 1-alkyl-3-aryl (e. g. 1-ethyl-3-phenyl, 1-n-heptyl-3-phenyl, etc.) derivatives, those of the rhodanine series ( i. e. 2-thio-2,4-thiazolidinedione series) such as rhodanine, 3-alkylrhodanines (e. g. 3-ethylrhodanine, 3-allylrhodanine, etc.) or 3-arylrhodanines (e. g. 3-phenylrhodanine, etc.), etc., those of the thiorhodanine series (e. g. 3-alkyl-2,4-dithio-2,4-thiazolidinediones), such as 3-ethyl-2,4-dithio-2,4-thiazolidinedione, etc.), those of the 2(3H)-imidazo[1,2-α]pyridone series, those of the 5,7-dioxo-6,7-dihydro-5-thiazolo[3,2-α]pyrimidine series (e. g. 5,7-dioxo-3-phenyl-6,7-dihydro-5-thiazolo 3,2-α pyrimidine, etc.), those of the 2-thio-2,4-oxazolidinedione series (i. e. those of the 2-thio-2,4(3H,5H)-oxazoledione series) (e. g. 3-ethyl-2-thio-2,4-oxazolidinedione etc.), those of the thianaphthenone series (e. g. 3(2H-thianaphthenone, etc.), those of the 2-thio-2,5-thiazolidinedione series (i. e. the 2-thio-2,5(3H,5H)-thiazoledione series) (e. g. 3-ethyl-2-thio-2,5-thiazolidinedione, etc.), etc., n, d and m each represents a positive integer of from 1 to 2, and Z and $Z_1$ each represents the non-metallic atoms necessary to complete a heterocyclic nucleus containing from 5 to 6 atoms in the heterocyclic ring, such as those selected from the group consisting of those of the thiazole series (e. g. thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, etc.), those of the thionaphtheno-7′,6′,4,5 - thiazole series (e. g. 4′ - methoxythionaphtheno-7′,6′,4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5 - phenylbenzoxazole, 5 - methylbenzoxazole, 6-methylbenzoxazole, 5,6 - dimethylbenzoxazole, 4,6 - dimethylbenzoxazole, 5-methoxybenzoxazole, 6-methoxybenzoxazole, 5 - ethoxybenzoxazole, 6 - chlorobenzoxazole, 5 - hydroxybenzoxazole, 6 - hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5 - methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6 - methoxyquinoline, 6 - ethoxyquinoline, 6 - hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline 3,4-dihydrisoquinoline etc.), those of the 3,3-dialkylindolenine series (e. g. 3,3-dimethylindolenine, 3,3,5-trimethylindolenine, 3,3,7-trimethylindolenine, etc.), those of the 2-pyridine series (e. g. pyridine, 3-methylpyridine, 4-methylpyridine, 5-methylpyridine, 6 - methylpyridine, 3,4 - dimethylpyridine, 3,5-dimethylpyridine, 3,6-dimethylpyridine, 4,5-dimethylpyridine, 4,6-dimethylpyridine, 4-chloropyridine, 5 - chloropyridine, 6 - chloropyridine, 3 - hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g. 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc.

It is accordingly an object of our invention to provide a new class of non-ionized cyanine dyes. A further object is to provide methods for making these new dyes. Still another object is to provide photographic silver halide emulsions sensitized with these new dyes. Another object is to provide a method of making such photographic silver halide emulsions. Other objects will become apparent from a consideration of the following description and examples.

According to our invention we provide the new non-ionized dyes represented by Formula I above wherein $d$ represents 1 by reacting a merocarbocyanine dye selected from those represented by the following general formula:

II.

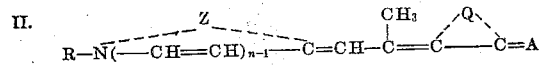

wherein R, A, Q, $n$ and Z each have the values given above, with a cyclammonium quaternary salt selected from those represented by the following general formula:

III.

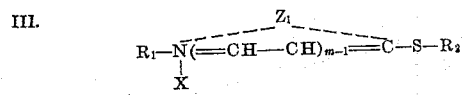

wherein $R_1$, $m$ and $Z_1$ each have the values given above, $R_2$ represents an alkyl group (e. g. methyl, ethyl, etc) or an aryl group (e. g. phenyl, o-, m-, and p-tolyl, etc.), and X represents an acid anion, e. g. chloride, bromide, iodide, thiocyanate, sulfamate, methyl sulfate, ethyl sulfate, perchlorate, p-toluenesulfonate, etc.

The condensations can be accelerated by heating, and generally, temperatures varying from room temperature to about reflux temperature of the reaction mixture can be used. The condensations can also be carried out in the presence of an inert solvent, such as pyridine, quinoline, isoquinoline, ethanol, n-propanol, n-butanol, etc. Advantageously, the condensations are carried out in the presence of a basic condensing agent, such as the trialkyl amines (e. g. triethylamine, tri-n-propylamine, tri-n-butylamine, etc.), N-methylpiperidine, N-ethylpiperidine, N,N-dimethylaniline, etc. The intermediates represented by Formula II above can be prepared as described in Kendall U. S. Patent 2,272,163, Brooker and White U. S. Patents 2,165,338 and 2,263,757; or according to the process described in Kendall U. S. Patent 2,265,908.

The new non-ionized cyanine dyes of our invention represented by Formula I above wherein $d$ represents 2 can be prepared by condensing a merocarbocyanine dye selected from those represented by Formula II above with a cyclammonium quaternary salt selected from those represented by the following general formula:

IV.

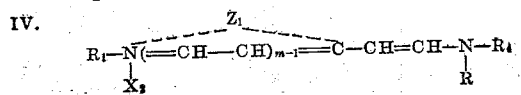

wherein $R_1$, $m$ and $Z_1$ each have the values set forth above, $R_4$ represents an acyl group (e. g. acetyl, propionyl, benzoyl, etc.), $R_5$ represents an aryl group (e. g. phenyl, o-, m- and p-tolyl, etc.), and $X_2$ represents an acid anion, such as those set forth above for X. The condensations can be accelerated by heating the reaction mixture, generally, the temperatures varying from room temperature to the reflux temperature of the reaction mixture. The condensations can be carried out in the presence of an inert solvent, such as pyridine, nitrobenzene, ethanol, n-propanol and n-butanol. Advantageously, the condensations are carried out in the presence of a basic condensing agent, such as those set forth above wherein compounds of Formula II are condensed with those of Formula III.

Alternately, we have found that the new non-ionized cyanine dyes of our invention represented by Formula I wherein $d$ represents 1 can be prepared by condensing a carbocyanine dye selected from those represented by the following general formula:

V.

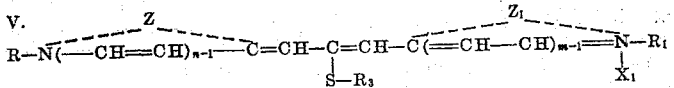

wherein R, $R_1$, $n$, $m$, Z and $Z_1$ each have the values set forth above, $R_3$ represents an alkyl group, (e. g. methyl, ethyl, etc.), or an aryl group (phenyl, o-, m-, and p-tolyl, etc.), and $X_1$ represents an acid anion, such as those set forth above for X, with a keto-methylene compound selected from those represented by the following general formula:

VI.

wherein Q and A have the values given above. The condensations can be carried out in the presence of an inert solvent, such as pyridine, ethanol, n-propanol, n-butanol, etc., and the condensations can be accelerated by heat. Generally, temperatures varying from room temperature to the reflux temperature of the reaction mixture can be used. Advantageously, the condensations are carried out in the presence of a basic condensing agent, such as those set forth above for the condensation of the compounds of Formula II with those of Formula III.

We have also found that new non-ionized styryl dyes can be prepared by condensing a compound selected from those of Formula II above with an aromatic aldehyde, such as p-dimethylamino benzaldehyde, p-diethylaminobenzaldehyde, etc.

The intermediates selected from those represented by Formula V above can be prepared according to the methods described in Schulz U. S. Patent 2,156,464, Kendall U. S. Patents 2,397,013 and 2,397,014, and Van de Straete U. S. Patent 2,484,536.

The following examples will serve to illustrate more fully the manner whereby we prepare the new non-ionized dyes of our invention.

EXAMPLE I

5-[di(3-ethyl-2(3H)-benzothiazolylidene) isopropylidene]-1-methyl-2-thiobarbituric acid

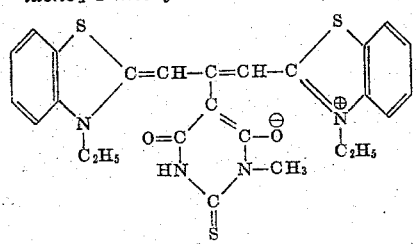

A mixture of 1.80 g. (1 mol.) of 5-[(3-ethyl-2(3H)-benzothiazolylidene)isopropylidene] - 1 - methyl - 2-thiobarbituric acid, 5.24 g. (1 mol. plus 200% excess)

of 2-ethylmercaptobenzothiazole ethoethylsulfate and 1.52 g. (1 mol. plus 200% excess) of triethylamine in 20 ml. of pyridine was heated at the refluxing temperature for 20 minutes. After cooling to room temperature, the reaction mixture was filtered and the residue was washed first with methyl alcohol and then several portions of pyridine. The residue was dissolved in 30 ml. of pyridine and the solution was chilled and filtered. The pyridine filtrate and all pyridine washings were combined, concentrated and chilled. Then the dye was recrystallized from pyridine. The yield of dye was 54%. The dark green crystals had melting point 327–328° C. with decomposition, and they sensitized a photographic gelatino-silver-bromoiodide emulsion to about 645 mu with maximum sensitivity at about 620 mu.

EXAMPLE 2

*1,3-diethyl-5-[(3-ethyl-2(3H)-benzothiazolylidene) (1-ethyl-2(1H)-β-naphthothiazolylidene)isopropylidene]2-thiobarbituric acid*

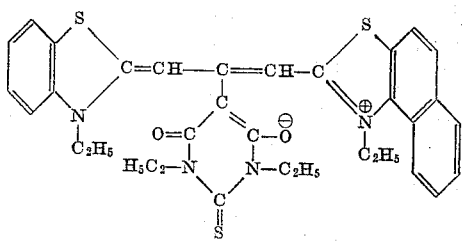

A mixture of 2.26 g. (1 mol.) of 1,3-diethyl-5-[(1-ethyl-2(1H) - β - naphthothiazolylidene)isopylidene] - 2-thiobarbituric acid, 5.24 g. (1 mol. plus 200% excess) of 2-ethylmercaptobenzothiazole ethoethylsulfate and 1.52 g. (1 mol. plus 200% excess) of triethylamine in 20 ml. of pyridine was heated at the refluxing temperature for 15 minutes. After cooling to room temperature, the solid was collected on a filter and washed with warm pyridine. The yield of dye was 66% crude and 46% after two recrystallizations from pyridine. The dark green crystals had melting point 306–307° C. with decomposition, and they sensitized a photographic gelatino-silver-bromoiodide emulsion to about 670 mu with maximum sensitivity at about 645 mu.

EXAMPLE 3

*4-[di(1-ethyl - 2(1H) - β - naphthothiazolylidene)isopropylidene]-3-phenyl-5(4H)-isoxazolone*

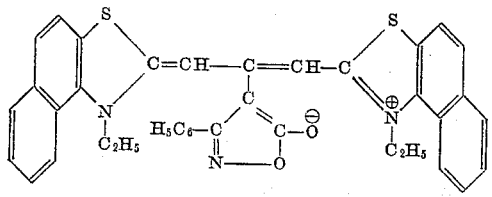

A mixture of 1.37 g. (1 mol.) of 4-[(1-ethyl-2(1H)-β - naphthothiazolylidene)isopropylidene] - 3 - phenyl-5-(4H)-isoxazolone, 3.54 g. (1 mol. plus 200% excess) of 2-ethylmercapto-β-naphthothiazole ethobromide and 1.01 g. (1 mol. plus 200% excess) of triethylamine in 15 ml. of dry pyridine was heated at the refluxing temperature for 30 minutes. After standing at room temperature for 10 minutes, a very small amount of methyl alcohol was added to the reaction mixture and then the dye was collected on a filter and washed with methyl alcohol. The yield of dye was 12% after two recrystallizations from pyridine. The very dark reddish crystals with a green reflux had melting point 314–315° C. with decomposition, and they sensitized a photographic gelatino-silver-bromoiodide emulsion to about 690 mu with maximum sensitivity at about 665 mu.

EXAMPLE 4

*1,3-diethyl-5 - [(3 - ethyl - 2(3H) - benzothiazolylidene) (3 - methyl - 2(3H) - benzothiazolylidene ethylidene)-isopropylidene]-2-thiobarbituric acid*

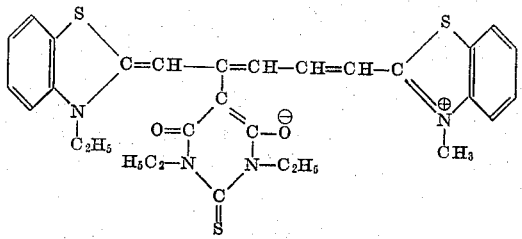

A mixture of 1.34 g. (1 mol.) of 1,3-diethyl-5-[(3-ethyl - 2(3H) - benzothiazolylidene)isopropylidene] - 2-thiobarbituric acid, 2.90 g. (1 mol. plus 100% excess) of 2-β-acetanilidovinylbenzothiazole methiodide and 0.68 g. (1 mol. plus 100% excess) of triethylamine in 20 ml. of dry pyridine was heated to the boiling point in 40 seconds, kept there for 10 seconds, and then chilled at once. The reaction mixture was stirred with cold water, filtered, and the sticky residue was washed with cold water. The residue became crystalline when it was stirred with methyl alcohol. The crystals were collected on a filter and washed with methyl alcohol. The residue was stirred with acetone, filtered, and the remaining portion washed with acetone. After several such treatments the acetone washings were blue. Then the dye was recrystallized from acetone. The yield of recrystallized dye was 9%. The dark green crystals had melting point 208–209° C. with decomposition, and they sensitized a photographic gelatino-silver-bromoiodide emulsion with maximum sensitivity at about 690 mu.

EXAMPLE 5

*4-[(5 - chloro - 3 - ethyl - 2(3H) - benzothiazolylidene)-α-(p - dimethylaminostyryl)ethylidene] - 3 - phenyl-5(4H)-isoxazolone*

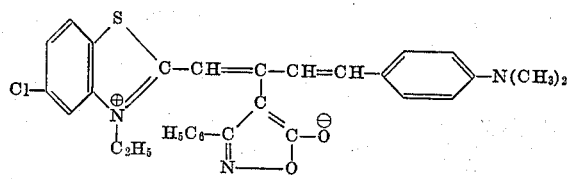

A mixture of 1.98 g. (1 mol.) of 4-[(5-chloro-3-ethyl-2-(3H)-benzothiazolylidene)isopropylidene] - 3 - phenyl-5(4H)-isoxazolone, 1.49 g. (1 mol. plus 100% excess) of p-dimethylaminobenzaldehyde and 1.0 ml. of piperidine were heated together in an oil-bath at 130–135° C. for 10 minutes. The cool reaction mixture was stirred with ether and then filtered. The residue was stirred with methyl alcohol, the suspension was chilled and then the dye was washed on the filter with methyl alcohol. The yield of dye was 50% crude and 30% after two recrystallizations from n-propyl alcohol. The dark green crystals decomposed from about 160° C.

EXAMPLE 6

*5-[di(3 - ethyl - 2(3H) - benzothiazolylidene)isopropylidene]-1-phenyl-2-thiobarbituric acid*

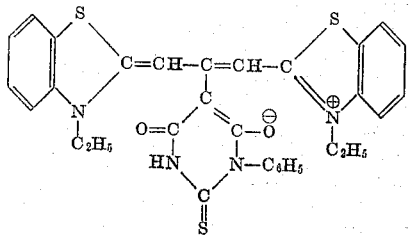

A mixture of 1.41 g. (1 mol.) of 5-[(3-ethyl-2(3H)-benzothiazolylidene)isopropylidene] - 1 - phenyl - 2 - thiobarbituric acid, 3.49 g. (1 mol. plus 200% excess) of 2-ethylmercaptobenzothiazole ethoethylsulfate and 1.01 g. (1 mol. plus 200% excess) of triethylamine in 30 ml. of dry pyridine was heated at the refluxing temperature for 15 minutes. After chilling, the dye was collected on the filter and washed with methyl alcohol. The yield of dye was 39% after two recrystallizations from nitrobenzene. The dark crystals with a green reflex had melting point above 335° C., and they sensitized a photographic gelatino-silver-bromoiodide emulsion to about 645 mu with maximum sensitivity at about 610 mu.

EXAMPLE 7

4-[di(3-methyl-2(3H)-benzothiazolylidene)isopropylidene]-1-phenyl-5-pyrazolone

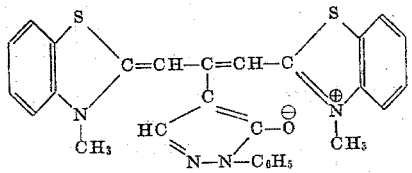

A mixture of 2.77 g. (1 mol.) of 3,3'-dimethyl-9-methylmercaptothiacarbocyanine p-toluenesulfonate, 0.80 g. (1 mol.) of 1-phenyl-5-pyrazolone and 0.51 g. (1 mol.) of triethylamine in 15 ml. of pyridine was heated at the refluxing temperature for 20 minutes. The cool reaction mixture was stirred with 250 ml. of methyl alcohol and then filtered. After washing the residue with methyl alcohol, the remaining portion was extracted with acetone. The dye, which separated on chilling the acetone extract, was recrystallized from acetone. The yield of dye, thus obtained was 24%. The dull reddish needles decomposed from about 175° C., and they sensitized a photographic gelatino-silver-bromoiodide emulsion to about 645 mu with maximum sensitivity at about 600 mu.

EXAMPLE 8

4-[di(3-methyl-2(3H)-benzothiazolylidene)isopropylidene]-3-methyl-1-phenyl-5-pyrazolone

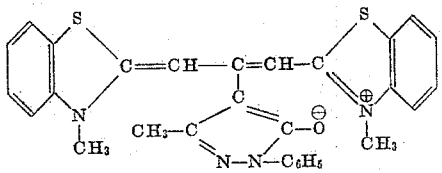

A mixture of 1.81 g. (1 mol.) of 3-methyl-4-[(3-methyl-2(3H) - benzothiazolylidene)isopropylidene] - 1 - phenyl-5-pyrazolone, 5.50 g. (1 mol. plus 200% excess) of 2-methylmercaptobenzothiazole metho-p-toluenesulfonate and 1.51 g. (1 mol. plus 200% excess) of triethylamine in 15 ml. of dry pyridine was heated at the refluxing temperature for about 15 minutes. After cooling, the reaction mixture was filtered and the residue was washed with methyl alcohol. The filtrate and washings were combined, then concentrated and treated with cold water. The aqueous layer was decanted and the oily residue was treated with successive portions of cold water. Finally the residue was dissolved in benzene and precipitated by adding ligroin (B. P. 90–120° C.). The yield of dye after another such purification was 12%. After another recrystallization from dry benzene, the dull brownish green crystals had melting point 293–294° C. with decomposition, and they sensitized a photographic gelatino-silver-bromoiodide emulsion to about 650 mu with maximum sensitivity at about 635 mu.

EXAMPLE 9

1-(2-benzothiazolyl)-3-methyl-4-[di(3-methyl-2(3H)-benzothiazolylidene)isopropylidene]-5-pyrazolone

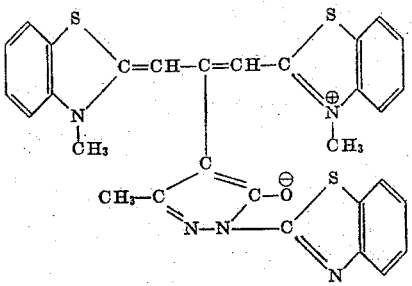

A mixture of 1.85 g. (1 mol.) of 3,3'-dimethyl-9-methylmercaptothiacarbocyanine p-toluenesulfonate, 2.31 g. (1 mol. plus 200% excess) of 1-(2-benzothiazolyl)-3-methyl-5-pyrazolone and 0.67 g. (2 mols.) of triethylamine in 20 ml. of pyridine was heated at the refluxing temperature for 15 minutes. After standing at room temperature for a few hours, the solid was collected on a filter. The residue was transferred to a beaker containing methyl alcohol. The orange crystals were floated away from the green and denser crystals, which remained on the bottom of the beaker. The yield of dye was 35% crude and 18% after one recrystallization from n-propyl alcohol. The very dark purplish crystals had melting point 333–334° C. with decomposition, and they sensitized a photographic gelatino-silver-bromoiodide emulsion to about 645 mu with maximum sensitivity at about 595 mu.

EXAMPLE 10

3-[di(3-methyl-2(3H)-benzothiazolylidene)isopropylidene]-2(3H)-imidazo[1,2-α]pyridone

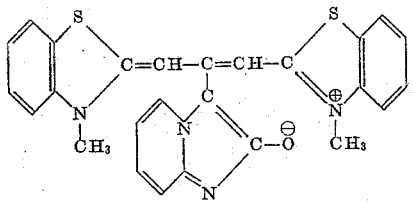

A mixture of 1.85 g. (1 mol.) of 3,3'-dimethyl-9-methylmercaptothiacarbocyanine p-toluenesulfonate, 1.14 g. (1 mol. plus 100% excess) of 2(3H)-imidazo[1,2-α]pyridone hydrochloride and 0.67 g. (2 mols.) of triethylamine in 25 ml. of dry pyridine was heated at the refluxing temperature for 20 minutes. After cooling, the dye was collected on a filter and washed with pyridine. The residue was stirred with 300 ml. of boiling pyridine and the suspension was filtered hot. The remaining residue was recrystallized once from n-propyl alcohol and then once from methyl alcohol. The yield of dye, thus obtained, was 43%. The very dark crystals had melting point 242–244° C. with decomposition, and they sensitized a photographic gelatino-silver-bromoiodide emulsion to about 670 mu with maximum sensitivity at about 645 mu.

EXAMPLE 11

4-[(5-chloro-3-ethyl - 2 - (3H) - benzothiazolylidene) (3-methyl - 2(3H)-benzothiazolylidene)isopropylidene]-3-phenyl-5(4H)-isoxazolone

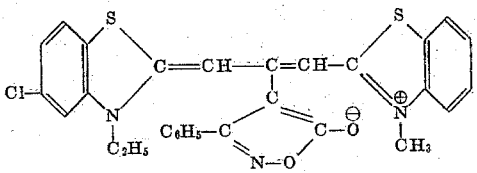

A mixture of 1.98 g. (1 mol.) of 4-[(5-chloro-3-ethyl-2(3H) - benzothiazolylidene)isopropylidene] - 3 - phenyl- 5(4H)-isoxazolone, 1.84 g. (1 mol.) of 2-methylmercaptobenzothiazole metho-p-toluenesulfonate and 0.51 g. (1 mol.) of triethylamine in 50 ml. of dry pyridine was heated at the refluxing temperature for 5 minutes. After cooling, the solid was collected on a filter and washed with methyl alcohol. The residue was stirred, in a beaker, with 100 ml. of hot ethyl alcohol and the suspension was filtered hot. The remaining solid was stirred, in a beaker, with 100 ml. of boiling pyridine. After chilling the suspension, the dye was collected on the filter. The dye was dissolved in 60 ml. of hot nitrobenzene, a few ml. of methyl alcohol was added, and the whole chilled. The yield of dye was 35%. The dull reddish clusters with a greenish reflex decomposed from about 185° C., and they sensitized a photographic gelatino-silver-bromoiodide emulsion to about 640 mu with maximum sensitivity at about 615 mu.

EXAMPLE 12

*1,3-diethyl - 5 - [(3-ethyl-2(3H)-benzothiazolylidene) (1-ethyl-2(1H) - quinolylidene)isopropylidene]-2-thiobarbituric acid*

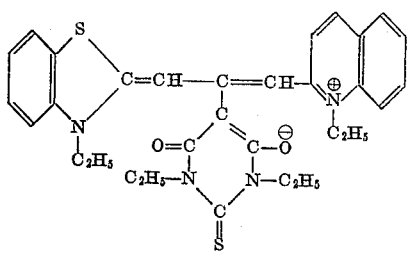

A mixture of 1.34 g. (1 mol.) of 1,3-diethyl-5-[(3-ethyl - 2(3H)-benzothiazolylidene)isopropylidene]-2-thiobarbituric acid, 3.93 g. (1 mol. plus 200% excess) of 2-phenylmercaptoquinoline ethiodide and 1.01 g. (1 mol. plus 200% excess) of triethylamine in 20 ml. of dry pyridine was heated at the refluxing temperature for 15 minutes. After chilling, the reaction mixture was filtered. The filtrate was concentrated and stirred with ice-water and then filtered. The residue was stirred, in a beaker, with hot methyl alcohol. After chilling the suspension, the dye was collected on a filter and washed with methyl alcohol. The yield of dye was 59% crude and 38% after two recrystallizations from pyridine. The small dark green and larger brassy crystals had melting point 241–243° C. with decomposition, and they sensitized a photographic gelatino-silver-bromoiodide emulsion to about 705 mu, with maximum sensitivity at about 685 mu.

EXAMPLE 13

*1,3-diethyl-5-[(1 - ethyl -2(1H)-β-naphthothiazolylidene) (3-methyl - 2(3H)-benzoxazolylidene)isopropylidene]-2-thiobarbituric acid*

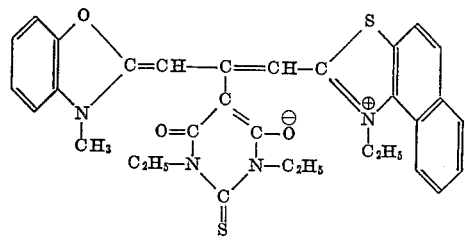

A mixture of 1.51 g. (1 mol.) of 1,3-diethyl-5-[(1-ethyl-2(1H)-β - naphthothiazolylidene)isopropylidene]-2-thiobarbituric acid, 2-methylmercaptobenzoxazole metho-p-toluenesulfonate (prepared by heating 1.65 g. of 2-methylmercaptobenzoxazole and 1.86 g. of methyl p-toluenesulfonate together at the temperature of the steam bath for several hours) and 1.01 g. (1 mol. plus 200% excess) of triethylamine in 20 ml. of dry pyridine was heated at the refluxing temperature for 20 minutes. After cooling, the dye was collected on a filter and washed with methyl alcohol. The yield of dye was 85% crude and 43% after two recrystallizations from pyridine. The green crystals had melting point 294–296° C. with decomposition, and they sensitized a photographic gelatino-silver-bromoiodide emulsion to about 645 mu with maximum sensitivity at about 605 mu.

EXAMPLE 14

*1,3-diethyl-5-[di(1-ethyl-2(1H)-β-naphthothiazolylidene)isopropylidene]barbituric acid*

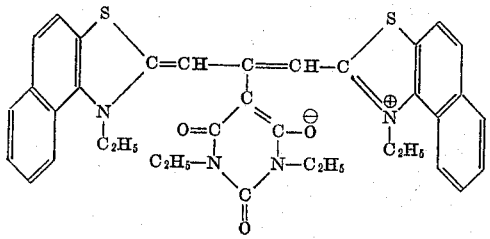

A mixture of 1.45 g. (1 mol.) of 1,3-diethyl-5-[(1-ethyl - 2(1H)-β - naphthothiazolylidene)isopropylidene]-barbituric acid, 3.54 g. (1 mol. plus 200% excess) of 2-ethylmercapto-β-naphthothiazole ethobromide and 1.01 g. (1 mol. plus 200% excess) of triethylamine in 20 ml. of dry pyridine was heated at the refluxing temperature for 20 minutes. A small amount of methyl alcohol was added to the reaction mixture and the whole chilled. After filtering, the residue was extracted with pyridine and filtered. This filtrate and the mother liquors from the reaction mixture were combined and concentrated. After chilling, the dye was collected on a filter and washed with methyl alcohol. The yield of dye was 16% crude and 9% after two recrystallizations from pyridine. The dark green crystals had melting point 314–315° C. with decomposition, and they sensitized a photographic gelatino-silver-bromoiodide emulsion to about 690 mu with maximum sensitivity at about 660 mu.

EXAMPLE 15

*2-[di(1-ethyl-2(1H)-β-naphthothiazolylidene)-isopropylidene]-1,3-indandione*

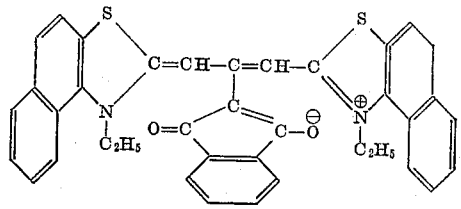

A mixture of 1.32 g. (1 mol.) of 2-[(1-ethyl-2(1H)-β-naphthothiazolylidene)isopropylidene]-1,3 - indandione, 3.54 g. (1 mol. plus 200% excess) of 2-ethylmercapto-β-naphthothiazole ethobromide and 1.01 g. (1 mol. plus 200% excess) of triethylamine in 20 ml. of dry pyridine was heated at the refluxing temperature for one hour. After cooling to about room temperature, some methyl alcohol was added and then the dye was washed on the filter with methyl alcohol. The residue was extracted with hot pyridine. The pyridine filtrate was concentrated and chilled. The yield of dye was 21% crude and 10% after two recrystallizations from pyridine. The very dark greenish needles had melting point 316–317° C. with decomposition, and they sensitized a photographic gelatino-silver-bromoiodide emulsion to about 665 mu with maximum sensitivity at about 630 mu.

Other ketomethylene compounds than those illustrated in the above examples can be employed in the condensation of the meso-substituted carbocyanine dyes of Formula V with the compounds of Formula VI. For example, 1,3-di(β-methoxyethyl)barbituric acid can replace the 1-phenyl-5-pyrazolone of Example 7 above, to give the non-ionized dye having the following formula:

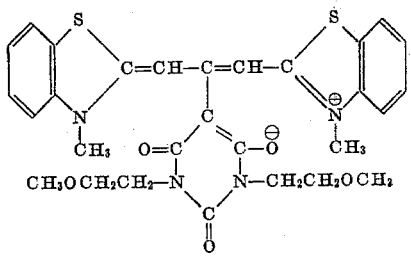

Also, we have found that certain "open chain" ketomethylene compounds can be condensed with the intermediates of Formula V to give non-ionized dyes, some of which can be quaternized with alkyl salts, such as the alkyl p-toluenesulfonates. Representative of the non-ionized cyanine dyes obtained from open chain compounds are those of the following general formula:

VII.

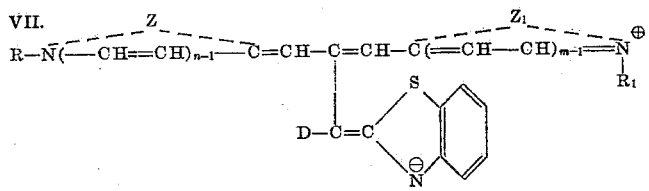

wherein R, R₁, n, m, Z and Z₁ each have the values given above and D represents a cyano (CN) group or a benzothiazolyl group. Examples 16 and 17 below will serve to illustrate the manner whereby we prepare the dyes of Formula VII, and Examples 18, 19 and 20 will serve to illustrate how the dyes of Formula VII can be quaternized with an alkyl salt.

EXAMPLE 16

*1-(2-benzothiazolyl)-1-cyano-2,2-di(3-methyl-2(3H)-benzothiazolylidenemethyl)ethylene*

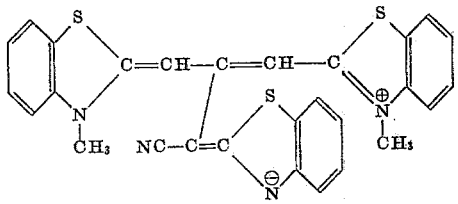

A mixture of 1.85 g. (1 mol.) of 3,3'- dimethyl-9-methylmercaptothiacarbocyanine p-toluenesulfonate, 1.74 g. (1 mol.+200% excess) of 2-benzothiazolylacetonitrile and 0.67 g. (2 mol.) of triethylamine in 20 ml. of dry pyridine was heated at the refluxing temperature for 30 minutes. Ice and water were added to the cold reaction mixture. The dye was collected on a filter and washed with water. The residue was transferred to a beaker and stirred with hot methyl alcohol. After chilling, the solid was collected on a filter and washed with methyl alcohol. The residue was suspended in hot methyl alcohol and the suspension was filtered hot, and then this operation was repeated. The yield of dye was 82% crude and 67% after two recrystallizations from pyridine. The dark red crystals had melting point 249–250° C. with decomposition.

EXAMPLE 17

*1,1-di(2-benzothiazolyl)-2,2-di(3-methyl-2(3H)-benzothiazolylidenemethyl)ethylene*

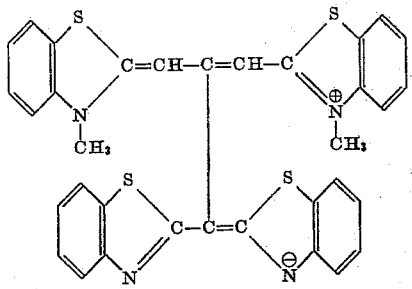

A mixture of 5.54 g. (1 mol) of 3,3'-dimethyl-9-methylmercaptothiacarbocyanine p-toluenesulfonate, 4.23 g. (1 mol.+50% excess) of di(2-benzothiazolyl)methane and 2.02 g. (2 mol) of triethylamine in 50 ml. of dry pyridine was heated at the refluxing temperature for 20 minutes. Ice and water were added to the cold reaction mixture. The dye was collected on a filter and washed with water. The residue was transferred to a beaker and stirred with hot methyl alcohol. After chilling, the solid was collected on a filter and washed with methyl alcohol. The residue was suspended in hot methyl alcohol and the suspension was filtered hot, and then this operation was repeated. The yield of dye was 66% crude and 47% after two recrystallizations from pyridine. The dull dark green crystals decomposed from about 181° C.

EXAMPLE 18

*9-[cyano(3-methyl-2(3H)-benzothiazolylidene) methyl]-3,3'-dimethylthiacarbocyanine p-toluenesulfonate*

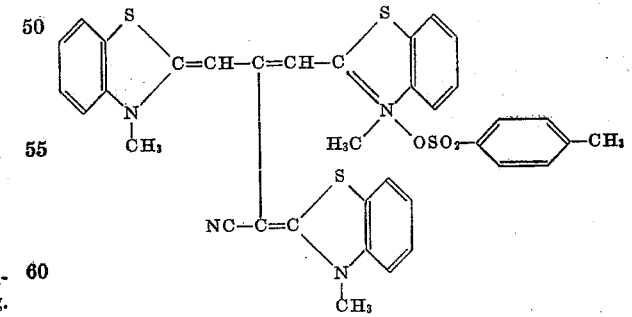

A mixture of 0.51 g. (1 mol) of 1-(2-benzothiazolyl)-1-cyano-2,2-di(3-methyl-2(3H)-benzothiazolylidenemethyl)ethylene and 0.19 g. (1 mol) of methyl p-toluenesulfonate were fused by heating them together over a free flame and then heating was continued at the temperature of the steam-bath for three hours. The reaction mixture was extracted with hot methyl alcohol. After filtering, the filtrate was concentrated and then chilled. The dye was collected on the filter and washed with methyl alcohol. The yield of dye was 46% after being recrystallized from ethyl alcohol. The green crystals had melting point 218–219° C. with decomposition.

EXAMPLE 19

9-[(2-benzothiazolyl) (3-methyl-2(3H)-benzothiazolylidene)methyl]-3,3'-dimethylthiacarbocyanine p-toluenesulfonate

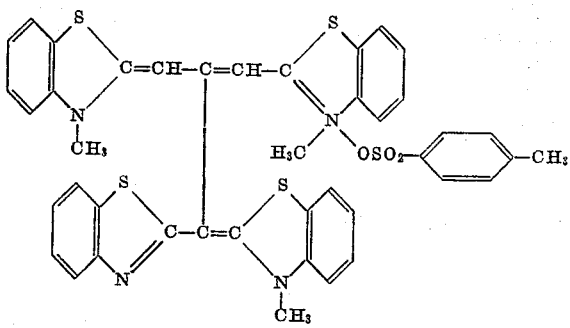

A mixture of 1.03 g. (1 mol) of 1,1-di-(2-benzothiazolyl-2,2-di(3-methyl-2(3H)-benzothiazolylidenemethyl)ethylene and 0.31 g. (1 mol) of methyl p-toluenesulfonate were heated together at the temperature of the steam-bath for about 18 hours. The mixture was extracted with hot methyl alcohol. After filtering, the filtrate was concentrated and then chilled. The dye was collected on a filter and washed with methyl alcohol. The yield of dye was 59% in two crops, after being recrystallized from ethyl alcohol. The green crystals had melting point 313–315° C. with decomposition.

EXAMPLE 20

9-[(2-benzothiazolyl metho-p-toluenesulfonate) (3-methyl-2(3H)-benzothiazolylidene) methyl]-3,3'-dimethylthiacarbocyanine p-toluenesulfonate

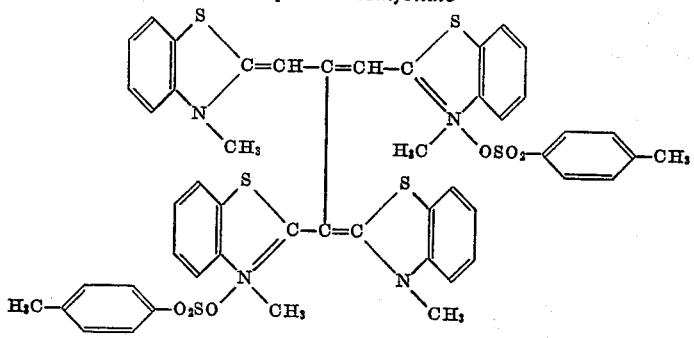

A mixture of 1.03 g. (1 mol) of 1,1-di(2-benzothiazolyl-2,2-di(3-methyl-2(3H)-benzothiazolylidenemethyl)ethylene and 1.24 g. (2 mol+100% excess) of methyl p-toluenesulfonate was heated in an oil-bath. At the start, the temperature of the oil-bath was 100° C. and the temperature was gradually raised to 125° C. during the heating period of three hours. The reaction mixture was extracted with ether. The remaining portion was extracted with hot methyl alcohol. After filtering, the filtrate was concentrated and then chilled. The dye was collected on a filter and washed with methyl alcohol. The yield of dye was 39% in two crops, after being recrystallized from ethyl alcohol. The green crystals had melting point 325–326° C. with decomposition.

EXAMPLE 21

5-[(3-ethyl-2(3H)-benzothiazolylidene) (1-methyl-2-(1H)-β-naphthoxazolylidene)isopropylidene]-1-methyl-2-thiobarbituric acid

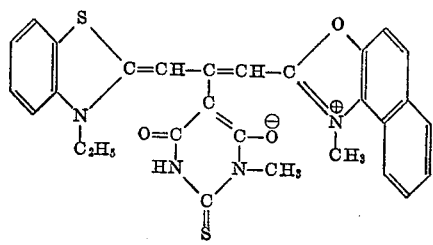

A mixture of 1.20 g. (1 mol.) of 5-[(3-ethyl-2(3H)-benzothiazolylidene) isopropylidene]-1-methyl-2-thiobarbituric acid, 3.41 g. (1 mol. plus 200% excess) of 2-methylmercapto-β-naphthoxazole metho-methylsulfate (prepared by heating 2.15 g. of 2-methylmercapto-β-naphthoxazole and 1.26 g. of methyl sulfate together at the temperature of the steam bath for 24 hours) and 1.01 g. (1 mol. plus 200% excess) of triethylamine in 25 ml. of dry pyridine was heated at the refluxing temperature for 20 minutes. After chilling, the dye was collected on a filter and washed with pyridine and then methyl alcohol. The yield of dye was 42% crude and 27% after two recrystallizations from n-propyl alcohol. The minute dark reddish crystals with a green reflex had melting point 267–269° C. with decomposition, and they sensitized a photographic gelatino-silver-bromoiodide emulsion to about 630 mu with maximum sensitivity at about 600 mu.

EXAMPLE 22

5-[(3-ethyl-2(3H)-benzothiazolylidene) (3-ethyl-2(3H)-α-naphthothiazolylidene) isopropylidene] -1-methyl-2-thiobarbituric acid

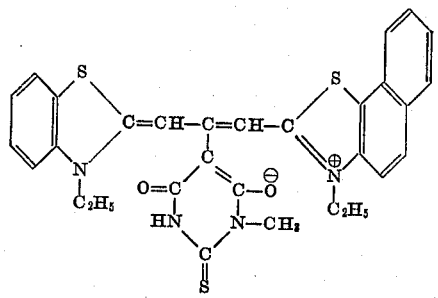

A mixture of 1.20 g. (1 mol.) of 5-[(3-ethyl-2(3H)-benzothiazolylidene)isopropylidene]-1-methyl-2-thiobarbituric acid, 4.01 g. (1 mol. plus 200% excess) of 2-ethylmercapto-α-naphthothiazole ethiodide and 1.01 g. (1 mol. plus 200% excess) of triethylamine in 25 ml. of dry pyridine was heated at the refluxing temperature for 20 minutes. After chilling, the solids were collected on a filter and washed with pyridine and then methyl alcohol. The residue was stirred with boiling methyl alcohol and the suspension was filtered hot. The dye was dissolved in hot cresol and ether was added to the filtrate. After chilling, the crystals were collected on a filter and washed with methyl alcohol. After another such purification the yield of dye was 22%. The dark green crystals had melting point above 325° C., and they sensitized a photographic gelatino-silver-bromoiodide emulsion to about 670 mu with maximum sensitivity at about 630 mu.

EXAMPLE 23

5-[(3-ethyl-2(3H)-benzothiazolylidene)(3-ethyl-4-methyl-thiazolylidene)isopropylidene]-1-methyl-2-thiobartituric acid

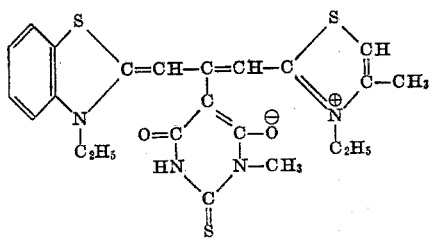

A mixture of 1.20 g. (1 mol.) of 5-[(3-ethyl-2(3H)-benzothiazolylidene)isopropylidene]-1-methyl-2-thiobarbituric acid, 3.61 g. (1 mol. plus 200% excess) of 4-methyl-2-phenylmercaptothiazole etho-ethylsulfate (prepared by heating 2.07 g. of 4-methyl-2-phenylmercaptothiazole and 1.54 g. of ethyl sulfate together at the temperature of the steam bath for 24 hours) and 1.01 g. (1 mol. plus 200% excess) of triethylamine in 25 ml. of dry pyridine was heated at the refluxing temperature for 20 minutes. After chilling, the solid was collected on a filter and washed with methyl alcohol. The concentrated filtrate and washings were stirred with cold water. After chilling, the aqueous layer was decanted, the residue was washed several times with cold water, and then finally stirred with hot methyl alcohol. After chilling, the dye was collected on a filter and washed with methyl alcohol. The yield of dye was 37% after two recrystallizations from pyridine. The bronzy-green crystals had melting point 299–301° C. with decomposition, and they sensitized a photographic gelatino-silver-bromoiodide emulsion to about 630 mu with maximum sensitivity at about 590 mu.

EXAMPLE 24

5-[(3-ethyl-2(3H)-benzothiazolylidene)(1-ethyl-4(1H)-pyridylidene)isopropylidene]-1-methyl-2-thiobarbituric acid

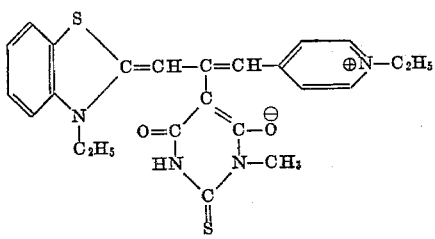

A mixture of 1.20 g. (1 mol.) of 5-[(3-ethyl-2(3H)-benzothiazolylidene)isopropylidene]-1-methyl-2-thiobarbituric acid, 3.43 g. (1 mol. plus 200% excess) of 4-phenylmercaptopyridine ethiodide and 1.01 g. (1 mol. plus 200% excess) of triethylamine in 25 ml. of dry pyridine was heated at the refluxing temperature for 20 minutes. After chilling, the solids were collected on the filter and washed with methyl alcohol. The concentrated filtrate and washings were stirred with cold water. After chilling, the aqueous layer was decanted and the sticky residue was stirred with successive portions of water, and then finally stirred with hot methyl alcohol. After chilling, the dye was collected on a filter and washed with methyl alcohol. The yield of dye was 4% after two recrystallizations from pyridine. The very dark crystals had melting point 240–241° C. with decomposition, and they sensitized a photographic gelatino-silver-bromoiodide emulsion to about 650 mu with maximum sensitivity at about 600 mu.

EXAMPLE 25

5-[(3-ethyl-2(3H)-benzothiazolylidene)(1-ethyl-4(1H)-quinolylidene)isopropylidene]-1-methyl-2-thiobarbituric acid

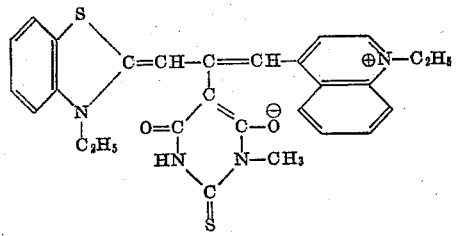

A mixture of 1.20 g. (1 mol.) of 5-[(3-ethyl-2(3H)-benzothiazolylidene)isopropylidene]-1-methyl-2-thiobarbituric acid, 4.37 g. (1 mol. plus 200% excess) of 4-phenylmercaptoquinoline etho-p-toluenesulfonate and 1.01 g. (1 mol. plus 200% excess) of triethylamine in 25 ml. of dry pyridine was heated at the refluxing temperature for 20 minutes. After chilling, the dye was collected on a filter and washed with pyridine and then methyl alcohol. The yield of dye was 68% crude and 59% after two recrystallizations from pyridine. The blue-green crystals had melting point 227–228° C. with decomposition, and they sensitized a photographic gelatino-silver-bromoiodide emulsion from about 600 mu to 735 mu with maximum sensitivity at about 700 mu.

EXAMPLE 26

1-ethyl-3-[di(3-ethyl-2(3H)-benzothiazolylidene)-isopropylidene]-2-thio-oxindole

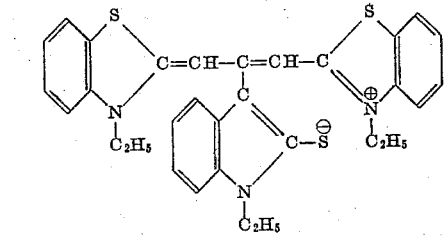

A mixture of 2.45 g. (1 mol.) of 3,3'-diethyl-9-methyl-mercaptothiacarbocyanine bromide, 1.77 g. (1 mol. plus 100% excess) of 1-ethyl-2-thio-oxindole and 0.51 g. (1 mol.) of triethylamine in 25 ml. of dry pyridine was heated at the refluxing temperature for five minutes. After chilling, the solids were collected on the filter and washed with methyl alcohol. The residue was extracted with successive portions of hot methyl alcohol. The yield of dye was 11% after two recrystalizations from pyridine. The minute reddish-purple crystals had melting point 279–282° C. with decomposition, and they sensitized a photographic gelatino-silver-bromoiodide emulsion to about 630 mu with maximum sensitivity at about 600 mu.

EXAMPLE 27

5-[(5-chloro-1,3-diethyl-2(3H)-benzimidazolylidene)(3-ethyl-2(3H)-benzothiazolylidene)isopropylidene]-1-methyl-2-thiobarbituric acid

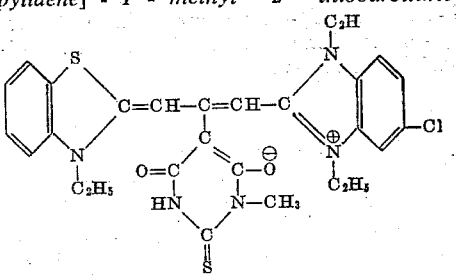

A mixture of 1.20 g. (1 mol.) of 5-[(3-ethyl-2(3H)-benzothiazolylidene)isopropylidene]-1-methyl-2- thiobarbituric acid, 3.95 g. (1 mol. plus 200% excess) of 5 - chloro - 1 - ethyl - 2 - ethylmercaptobenzimidazole etho-ethylsulfate (prepared by heating 2.41 g. of 5-chloro-1-ethyl-2-ethylmercaptobenzimidazole and 1.54 g. of ethyl sulfate together at the temperature of the steam bath for 24 hours) and 1.01 g. (1 mol. plus 200% excess) of triethylamine in 25 ml. of dry pyridine was heated at the refluxing temperature for 20 minutes. After chilling, the solid was collected on a filter and washed with methyl alcohol. The concentrated filtrate and washings were stirred with cold water. After chilling, the aqueous layer was decanted and the oily residue was stirred with several successive portions of cold water. The oily portion was stirred with hot methyl alcohol. After chilling and filtering, the filtrate was concentrated. The oily residue was stirred with ligroin (B. P. 90–120° C.) and the ligroin layer was decanted. The residue was recrystallized from ethyl acetate. The reddish crystals decomposed from about 185° C., and they sensitized a photographic gelatino-silver-bromoiodide emulsion to about 570 mu with maximum sensitivity at about 530 mu.

EXAMPLE 28

*1,3 - diethyl - 5 - [(3 - ethyl - 2(3H) - benzothiazolylidene) (1 - methyl - 2(1H) - β - naphthoselenazolylidene)isopropylidene]-2-thiobarbituric acid*

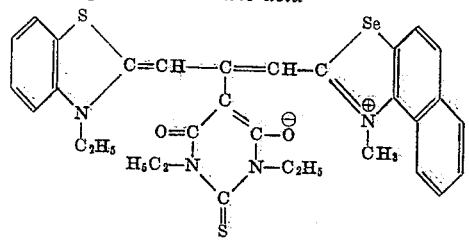

A mixture of 1.00 g. (1 mol.) of 1,3-diethyl-5-[(3-ethyl-2(3H) - benzothiazolylidene)isopropylidene] - 2 - thiobarbituric acid, 2.32 g. (1 mol. plus 100% excess) of 2-methylmercapto-β-naphthoselenazole metho-p-toluenesulfonate and 0.51 g. (1 mol. plus 100% excess) of triethylamine in 15 ml. of dry pyridine was heated at the refluxing temperature for five minutes. After chilling, the dye was collected on a filter and washed with methyl alcohol. The yield of dye was 89% crude and 40% after two recrystallizations from pyridine. The green crystals had melting point above 340° C., and they sensitized a photographic gelatino-silver-bromoiodide emulsion from about 540 mu to about 680 mu with maximum sensitivity at about 660 mu.

EXAMPLE 29

*5 - [1 - ethyl - 2(1H) - β - naphthothiazolylidene) (1,3,3 - trimethyl - 2(1H) - indolylidene)isopropylidene] - 1 - methyl-2-thiobarbituric acid*

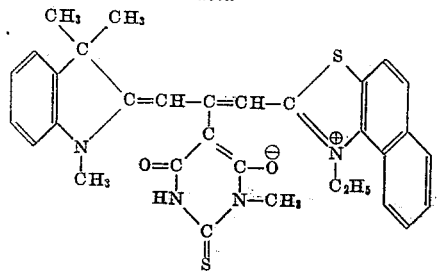

A mixture of 1.18 g. (1 mol.) of 1-methyl-5-[(1,3,3-trimethyl - 2(1H) - indolylidene)isopropylidene] - 2 - thiobarbituric acid, 3.99 g. (1 mol. plus 200% excess) of 2 - ethylmercapto - β - naphthothiazole etho - ethyl - sulfate and 1.01 g. (1 mol. plus 200% excess) of triethylamine in 25 ml. of dry pyridine was heated at the refluxing temperature for 20 minutes. After chilling, the dye was collected on a filter and washed with pyridine. The dye was extracted with hot n-propyl alcohol and then the residue was recrystallized from pyridine. The green and coppery green crystals had melting point 260–261° C. with decomposition, and they sensitized a photographic gelatino-silver-bromoiodide emulsion to about 635 mu with maximum sensitivity at about 620 mu.

EXAMPLE 30

*3 - ethyl - 5 - [di(1 - ethyl - 2(1H) - β - naphthothiazolylidene)isopropylidene]-4-thiorhodanine*

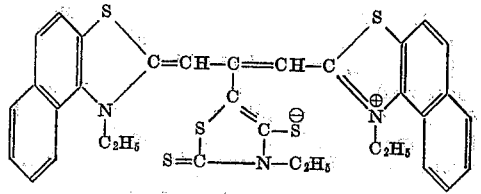

A mixture of 2.17 g. (1 mol.) of 3,3'-diethyl-9-ethylmercapto-4,5,4',5'-dibenzothiacarbocyanine ethylsulfate, 1.18 g. (1 mol. plus 100% excess) of 3-ethyl-4-thiorhodanine and 0.37 g. (1 mol. plus 10% excess) of triethylamine in 35 ml. of anhydrous ethyl alcohol was heated at the refluxing temperature for 15 minutes. After chilling, the solid was collected on a filter and washed with methyl alcohol. The residue was dissolved in hot pyridine. After chilling, the crystals were collected on a filter. The filtrate was concentrated. After chilling the crystals were collected on a filter and washed with methyl alcohol, and then recrystallized by dissolving them in hot pyridine and adding methyl alcohol to the filtrate. The yield of dye, thus obtained, was 24%. The dark purplish crystals had melting point 260–261° C. with decomposition, and they sensitized a photographic gelatino-silver-bromoiodide emulsion from about 550 mu to about 720 mu with maximum sensitivity at about 690 mu.

EXAMPLE 31

*5 - [(di(5 - chloro-3-ethyl-2(3H)-benzothiazolylidene)isopropylidene]-1-methyl-2-thiobarbituric acid*

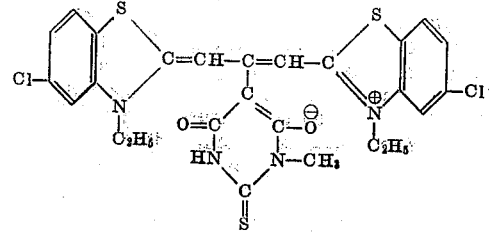

A mixture of 1.31 g. (1 mol.) of 5-[(5-chloro-3-ethyl-2(3H) - benzothiazolylidene)isopropylidene]-1-methyl-2-thiobarbituric acid, 3.86 g. (1 mol. plus 200% excess) of 5-chloro-2-ethylmercaptobenzothiazole ethiodide and 1.01 g. (1 mol. plus 200% excess) of triethylamine in 20 ml. of dry pyridine was heated at the refluxing temperature for 20 minutes. After chilling, the dye was collected on a filter and washed with pyridine and then methyl alcohol. The yield of dye was 12% after two recrystallizations from pyridine. The dark green crystals had melting point above 330° C., and they sensitized a photographic gelatino-silver-bromoiodide emulsion to about 640 mu with maximum sensitivity at about 605 mu.

EXAMPLE 32

*5 - [(3 - ethyl - 2(3H) - benzoselenazolylidene) (3 - ethyl-2(3H) - benzothiazolylidene)isopropylidene]-1-methyl-2-thiobarbituric acid*

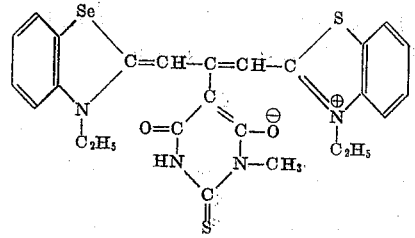

A mixture of 1.01 g. (1 mol.) of 5-[(3-ethyl-2(3H)-benzoselenazolylidene)isopropylidene] - 1 - methyl-2-thiobarbituric acid, 2.62 g. (1 mol. plus 200% excess) of 2-ethylmercaptobenzothiazole etho-ethylsulfate and 0.76 g. (1 mol. plus 200% excess) of triethylamine in 20 ml. of dry pyridine was heated at the refluxing temperature for 15 minutes. After chilling, the solids were collected on a filter and washed with pyridine and then with methyl alcohol. The concentrated filtrate and washings were stirred with cold water. After chilling, the solid was collected on a filter and washed with water. The residue was transferred to a beaker and stirred with boiling methyl alcohol. After chilling, the dye was collected on a filter and washed with methyl alcohol. The yield of dye was 27% after two recrystallizations from pyridine. The dull dark green crystals had melting point above 300° C., and they sensitized a photographic gelatino-silver-bromoiodide emulsion to about 650 mu with maximum sensitivity at about 625 mu.

EXAMPLE 33

5 - [di(1-ethyl-2(1H)-β-naphthothiazolylidene)isopropylidene]-1,3-di(β-methoxyethyl)barbituric acid

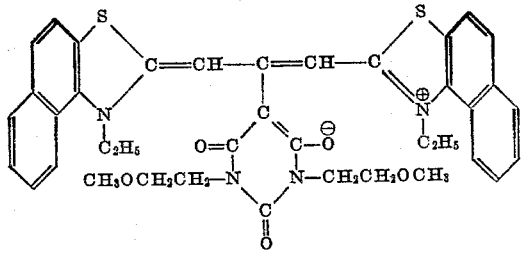

A mixture of 2.48 g. (1 mol.) of 5-[(1-ethyl-2(1H)-β-naphthothiazolylidene)isopropylidene]-1,3-di(β-methoxyethyl)barbituric acid, 3.99 g. (1 mol. plus 100% excess) of 2-ethylmercapto-β-naphthothiazole etho-ethylsulfate, 15 ml. of isoquinoline and 1.01 g. (1 mol. plus 100% excess) of triethylamine was heated in an oil bath at 165–169° C. for one hour. The cool reaction mixture was filtered, the residue was washed with a little methyl alcohol. The combined isoquinoline filtrate and alcoholic washings were treated with about 300 ml. of ether. The chilled mixture was filtered, and the residue was washed with ether. The residue was transferred to a beaker and treated with hot methyl alcohol. After chilling, the dye was collected on a filter and washed with methyl alcohol. The dye was purified by dissolving it in hot pyridine, filtering the solution and adding hot methyl alcohol to the hot pyridine filtrate. The yield of purified dye was 22%. The bronze-green crystals melted at 307–308° C. with decomposition and they sensitized a photographic gelatino-silver-bromoiodide emulsion with maximum sensitivity at about 670 mu.

EXAMPLE 34

5-[(di(1-ethyl-2(1H)-β-naphthothiazolylidene)isopropylidene]-1-n-heptylbarbituric acid

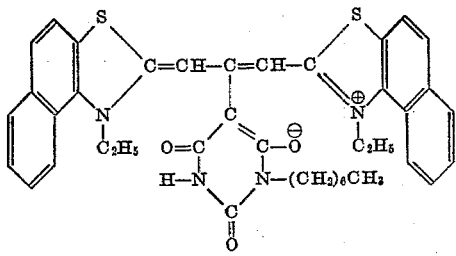

A mixture of 2.39 g. (1 mol.) of 5-[(1-ethyl-2(1H)-β-naphthothiazolylidene)isopropylidene]-1-n-heptylbarbituric acid, 3.99 g. (1 mol. plus 100% excess) of 2-ethyl-mercapto-β-naphthothiazole etho-ethylsulfate, 15 ml. of isoquinoline and 1.01 g. (1 mol. plus 100% excess) of triethylamine was heated in an oil bath at 165–170° C. for one hour. The dye was isolated and purified in the same manner as given in the previous example. The yield of purified dye was 15%. The dull green crystals melted at 296–297° C. with decomposition, and they sensitized a photographic gelatino-silver-bromoiodide emulsion with maximum sensitivity at about 660 mu.

EXAMPLE 35

5 - [(1 - ethyl-2(1H)-β-naphthothiazolylidene) (1-methyl-2(1H) - β - naphthothiazolylidene)isopropylidene]-1,3-di(β-methoxyethyl)barbituric acid

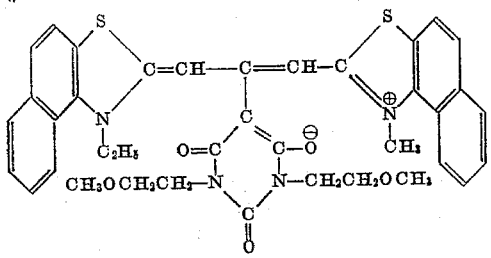

A mixture of 2.48 g. (1 mol.) of 5-[(1-ethyl-2-(1H)-β - naphthothiazolylidene)isopropylidene]-1,3-di(β-methoxyethyl)barbituric acid, 4.17 g. (1 mol. plus 100% excess) of 2-methylmercapto-β-naphthothiazole metho-p-toluenesulfonate, 35 ml. of pyridine and 1.01 g. (1 mol. plus 100% excess) of triethylamine was heated at the refluxing temperature for 30 minutes. After cooling, the dye was collected on a filter and washed with methyl alcohol. The dye was suspended in hot methyl alcohol and filtered. The yield of dye was 70% crude and 52% after two recrystallizations from pyridine. The melting point of the brassy-green crystals was above 320° C. and the dye sensitized a photographic gelatino-silver-bromoiodide emulsion with maximum sensitivity at about 655 mu.

EXAMPLE 36

5-[(1-ethyl-2(1H)-β-naphthothiazolylidene) (1 - methyl-2(1H) - β - naphthothiazolylidene)isopropylidene]-1-n-heptyl-3-phenylbarbituric acid

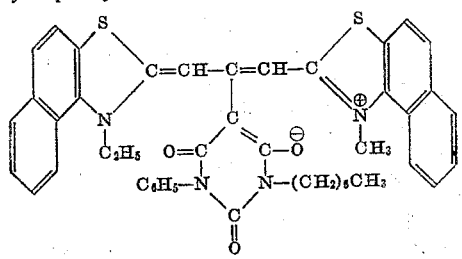

A mixture of 1.11 g. of 5-[(1-ethyl-2(1H)-β-naphthothiazolylidene)isopropylidene]-1-n-heptyl - 3 - phenylbarbituric acid, 1.67 g. (1 mol. plus 100% excess) of 2-methylmercapto-β-naphthothiazole metho-p-toluenesulfonate, 35 ml. of pyridine and 0.41 g. (1 mol. plus 100% excess) of triethylamine was heated at the refluxing temperature for 30 minutes. The cool reaction mixture was filtered. The residue was suspended in three successive portions of hot benzene and each hot suspension was filtered. The yield of dye after two recrystallizations from pyridine was 33%. The melting point of the green crystals was above 320° C. and the dye sensitized a photographic gelatino-silver-bromoiodide emulsion with maximum sensitivity at about 665 mu.

EXAMPLE 37

*1-ethyl-5-[di(1-ethyl-2(1H)-β-naphthothiazolylidene)isopropylidene]barbituric acid*

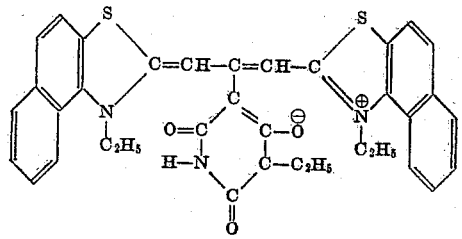

A mixture of 1.36 g. (1 mol.) of 1-ethyl-5-[(1-ethyl-2(1H)-β-naphthothiazolylidene)isopropylidene]barbituric acid, 3.54 g. (1 mol. plus 200% excess) of 2-ethylmercapto-β-naphthothiazole ethobromide, 20 ml. of dry pyridine and 1.01 g. (1 mol. plus 200% excess) of triethylamine was heated at the refluxing temperature for 20 minutes. The cold reaction mixture was filtered and the residue was washed with pyridine. The residue was extracted with some warm pyridine. The pyridine filtrate, washings and extract were combined, concentrated and then treated with cold water. After chilling, the aqueous pyridine was removed, the residue was treated with hot methyl alcohol and the suspension was filtered. The dye was given three recrystallizations from pyridine. The melting point of the shiny green crystals was above 330° C. and this dye sensitized a photographic gelatino-silver-bromoiodide emulsion with maximum sensitivity at about 630 mu.

EXAMPLE 38

*1,3-diethyl-5-[di(1-ethyl-2(1H)-β-naphthothiazolylidene)isopropylidene]-2-thiobarbituric acid*

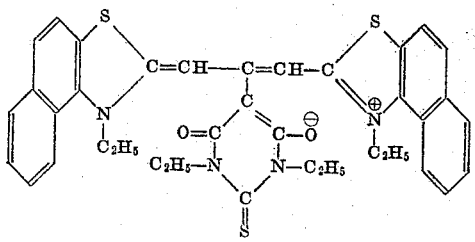

A mixture of 1.50 g. (1 mol.) of 1,3-diethyl-5-[(1-ethyl-2(1H)-β-naphthothiazolylidene)isopropylidene]-2-thiobarbituric acid, 3.54 g. (1 mol. plus 200% excess) of 2-ethylmercapto-β-naphthothiazole ethobromide, 10 ml. of pyridine and 1.01 g. (1 mol. plus 200% excess) of triethylamine was heated at the refluxing temperature for 15 minutes. The cool reaction mixture was filtered and the residue was washed with a little pyridine. The residue was extracted with pyridine and then twice recrystallized from pyridine. The yield of purified dye was 19%. The yellowish-green crystals melted at 309–310° C. with decomposition, and they sensitized a photographic gelatino-silver-bromoiodide emulsion with maximum sensitivity at about 665 mu.

EXAMPLE 39

*5-[(1-ethyl-2(1H)-β-naphthothiazolylidene) (1-methyl-2(1H)-β-naphthoselenazolylidene)isopropylidene]-1,3-di(β-methoxyethyl)barbituric acid*

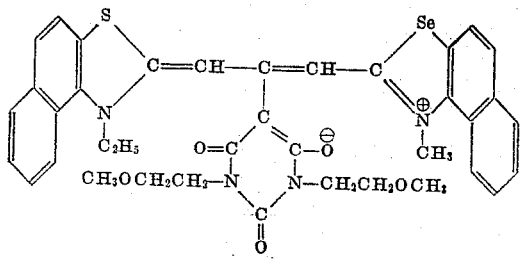

A mixture of 1.24 g. (1 mol.) of 5-[(1-ethyl-2(1H)-β-naphthothiazolylidene)isopropylidene]-1,3-di(β-methoxyethyl) barbituric acid, 2.32 g. (1 mol. plus 100% excess) of 2-methylmercapto-β-naphthoselenazole metho-p-toluenesulfonate, 25 ml. of dry pyridine and 0.51 g. (1 mol. plus 100% excess) of triethylamine was heated at the refluxing temperature for 10 minutes. The cool reaction mixture was filtered, the residue treated with hot methyl alcohol and the suspension was filtered. The yield of dye was 93% crude and 77% after two recrystallizations from pyridine. The brassy-green crystals melted at 317–318° C. with decomposition and they sensitized a photographic gelatino-silver-bromoiodide emulsion with maximum sensitivity at about 665 mu.

EXAMPLE 40

*5-[(1-ethyl-2(1H)-β-naphthothiazolylidene) (3-methyl-2(3H)-α-naphthoxazolylidene)isopropylidene]-1,3-di-(β-methoxyethyl)barbituric acid*

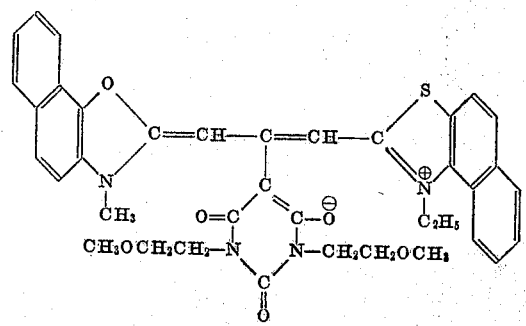

A mixture of 2.48 g. (1 mol.) of 5-[(1-ethyl-2(1H)-β-naphthothiazolylidene)isopropylidene]-1,3-di(β-methoxyethyl) barbituric acid, 4.01 g. (1 mol. plus 100% excess) of 2-methylmercapto-α-naphthoxazole metho-p-toluenesulfonate (prepared by heating 2.15 g. of 2-methylmercapto-α-naphthoxazole and 1.86 g. of methyl p-toluenesulfonate together at the temperature of the steam bath for 5 hours), 20 ml. of isoquinoline and 1.01 g. (1 mol. plus 100% excess) of triethylamine was heated in an oil bath at 160–170° C. for 67 minutes. The cool reaction mixture was filtered and the residue was washed with a little methyl alcohol. The combined filtrate and washings were treated with ether. After chilling, the ether layer was decanted and the residue was washed with ether. The residue was treated with hot methyl alcohol. After chilling, the suspension was filtered. The yield of dye was 12% after two recrystallizations from pyridine. The dark-red crystals with a green reflux melted at 302–303° C. with decomposition and they sensitized a photographic gelatino-silver-bromoiodide emulsion with maximum sensitivity at about 610 mu.

EXAMPLE 41

*1,3-diethyl-5-[(1-ethyl-2(1H)-β-naphthothiazolylidene) (1-methyl-2(1H)-β-naphthoxazolylidene) isopropylidene]barbituric acid*

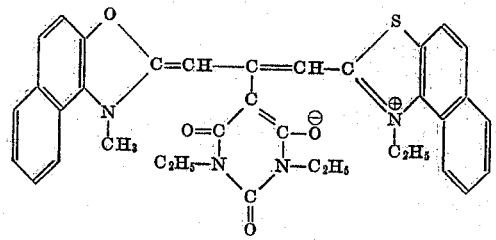

A mixture of 2.18 g. (1 mol.) of 1,3-diethyl-5-[(1-ethyl-2(1H)-β-naphthothiazolylidene)isopropylidene]-barbituric acid, 4.01 g. (1 mol. plus 100% excess) of 2-methylmercapto-β-naphthoxazole metho-p-toluenesulfonate (prepared by heating 2.15 g. of 2-methylmercapto-β-naphthoxazole and 1.86 g. of methyl p-toluenesulfonate together at the temperature of the steam bath for about 18 hours), 20 ml. of isoquinoline and 1.01 g. (1 mol. plus 100% excess) of triethylamine was heated in an oil bath at 165–167° C. for one hour. The dye was isolated and purified in the same manner as given in the previous example. The yield of dye was 4% after two recrystallizations from pyridine. The shiny bronze-green crystals melted at 272–274° C. with decomposition and they sensitized a photographic gelatino-silver-bromoiodide emulsion with maximum sensitivity at about 620 mu.

EXAMPLE 42

*1,3 - diethyl - 5 - [(1 - ethyl - 2(1H) - β - naphthothiazolylidene) (3 - ethyl - 2(3H) - α - naphthothiazolylidene) isopropylidene] barbituric acid*

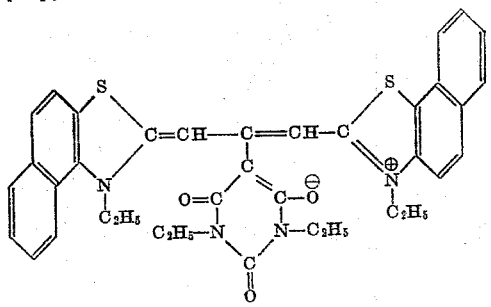

A mixture of 2.18 g. (1 mol.) of 1,3-diethyl-5-[(1-ethyl-2(1H) - β - naphthothiazolylidene)isopropylidene]barbituric acid, 4.01 g. (1 mol. plus 100% excess) of 2-ethylmercapto-α-naphthothiazole ethiodide, 25 ml. of isoquinoline and 1.01 g. (1 mol. plus 100% excess) of triethylamine was heated in an oil bath at 162–166° C. for one hour. The dye was isolated and purified in the same manner as given in the previous example. The yield of dye was 2% after two recrystallizations from pyridine. The melting point of the dark-green crystals was above 325° C. and the dye sensitized a photographic gelatino-silver-bromoiodide emulsion with maximum sensitivity at about 655 mu.

EXAMPLE 43

*5 - [di(3 - ethyl - 2(3H) - benzothiazolylidene)isopropylidene]rhodanine*

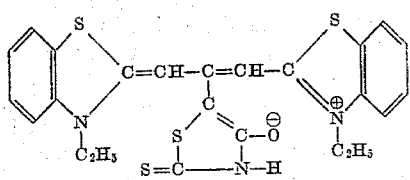

A mixture of 1.10 g. (1 mol.) of 3,3′-diethyl-9-ethylmercaptothiacarbocyanine iodide, 1.33 g. (1 mol. plus 400% excess) of rhodanine, 15 ml. of pyridine and 0.40 g. of triethylamine was heated at the refluxing temperature for 20 minutes. The cool reaction mixture was treated with cold water. After chilling, the solid was collected on a filter and washed with water. The residue was transferred to a beaker, treated with hot methyl alcohol and after chilling the suspension, the dye was collected on a filter and washed with methyl alcohol. The dye was dissolved in hot pyridine, the solution was filtered and hot methyl alcohol was added to the hot pyridine filtrate. After chilling, the solid was collected on a filter and washed with methyl alcohol. After another such purification the yield of dye was 66%. The dark-green crystals melted at 277–278° C. with decomposition and they sensitized a photographic gelatino-silver-bromoiodide emulsion with maximum sensitivity at about 620 mu.

In a like manner 3-allyl-5-[di(3-ethyl-2(3H)-benzothiazolylidene)isopropylidene]rhodanine was prepared by using 1.73 g. of 3-allylrhodanine in place of the 1.33 g. of rhodanine. The yield of purified dye was 60%. The green crystals melted at 228–230° C. with decomposition and they sensitized a photographic gelatino-silver-bromoiodide emulsion with maximum sensitivity at about 615 mu.

In a similar manner 3-ethyl-5-[di(3-ethyl-2(3H)-benzothiazolylidene)isopropylidene]rhodanine was prepared by using 1.61 g. of 3-ethylrhodanine in place of the 1.33 g. of rhodanine. The yield of purified dye was 73%. The green crystals melted at 261–262° C. with decomposition and they sensitized a photographic gelatino-silver-bromoiodide emulsion with maximum sensitivity at about 615 mu.

EXAMPLE 44

*1,1-dicyano-2,2-di(3-ethyl-2(3H)-benzothiazolylidenemethyl)ethylene*

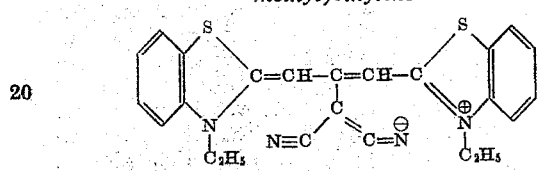

A mixture of 1.38 g. (1 mol.) of 3,3′-diethyl-9-ethylmercaptothiacarbocyanine iodide, 0.66 g. (1 mol. plus 300% excess) of malononitrile, 20 ml. of dry pyridine and 0.51 g. of triethylamine was heated at the refluxing temperature for 20 minutes. After chilling, the dye was collected on a filter and washed with methyl alcohol. The yield of dye was 89% crude and 68% after two recrystallizations from n-propyl alcohol. The orange-red crystals melted at 272–273° C. with decomposition and they sensitized a photographic gelatino-silver-bromoiodide emulsion to about 590 mu.

EXAMPLE 45

*1-benzoyl-1-cyano-2,2-di(3-ethyl-2(3H) - benzothiozolylidenemethyl)ethylene*

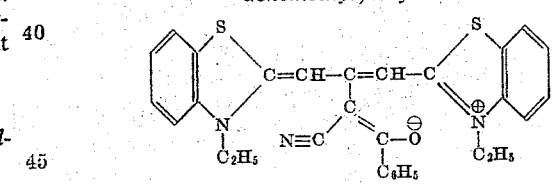

A mixture of 1.38 g. (1 mol.) of 3,3′-diethyl-9-ethylmercaptothiacarbocyanine iodide, 1.34 g. (1 mol. plus 300% excess) of benzoylacetonitrile, 20 ml. of dry pyridine and 0.51 g. of triethylamine was heated at the refluxing temperature for 20 minutes. The cold reaction mixture was treated with cold water and after chilling, the solid was collected on a filter and washed with water. The residue was treated with a little hot methyl alcohol. After chilling, the dye was collected on a filter and washed with cold methyl alcohol. The yield of dye was 24% crude and 12% after two recrystallizations from n-propyl alcohol. The dark-brownish crystals melted at 253–254° C. with decomposition and they sensitized a photographic gelatino-silver-bromoiodide emulsion to about 630 mu.

EXAMPLE 46

*1-(2-benzofuroyl)-1-cyano-2,2-di(3-ethyl-2(3H) - benzothiazolylidenemethyl)ethylene*

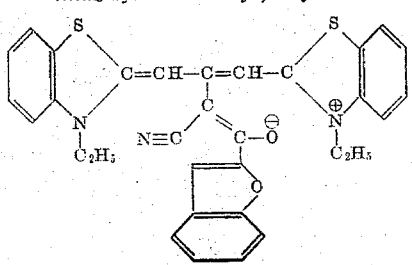

A mixture of 1.29 g. (1 mol.) of 2-{[(3-ethyl-2(3H)-benzothiazolylidene)isopropylidene]cyano acetyl} benzofuran, 3.49 g. (1 mol. plus 200% excess) of 2-ethylmercaptobenzothiazole etho-ethylsulfate, 20 ml. of pyridine and 1.01 g. (1 mol. plus 200% excess) of triethylamine was heated at the refluxing temperature for 20 minutes. The cooled reaction mixture was filtered and the filtrate was treated with cold water. After chilling, the solid was collected on a filter and washed with water. The residue was transferred to a beaker, stirred with hot methyl alcohol, the suspension was chilled and the dye was washed on the filter with methyl alcohol. The yield of purified dye, recrystallized from n-propyl alcohol, was 8%. The very dark crystals melted at 261–262° C. with decomposition and they sensitized a photographic gelatino-silver-bromoiodide emulsion to about 650 mu with maximum sensitivity at about 620 mu.

EXAMPLE 47

5-[di(3-ethyl-2(3H)-benzothiazolylidene)isopropylidene]barbituric acid

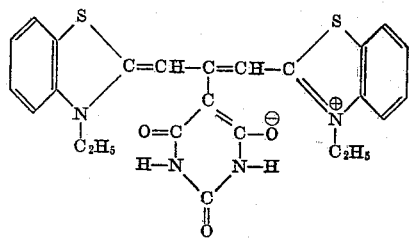

A mixture of 1.10 g. (1 mol.) of 5-[(3-ethyl-2(3H)-benzothiazolylidene)isopropylidene]barbituric acid, 6.98 g. (1 mol. plus 500% excess) of 2-ethylmercaptobenzothiazole etho-ethylsulfate, 25 ml. of dry pyridine and 2.02 g. (1 mol. plus 500% excess) of triethylamine was heated at the refluxing temperature for 20 minutes. The cool reaction mixture was filtered. The residue was extracted with 400 ml. of n-propyl alcohol. This extract was concentrated to about 100 ml. and filtered hot. The dye which separated from this chilled concentrated solution was recrystallized from n-propyl alcohol. The yield of dye was 4%. The melting point of the dark-red crystals was above 330° C. and the dye sensitized a photographic gelatino-silver-bromoiodide emulsion with maximum sensitivity at about 590 mu.

EXAMPLE 48

3-[di(3-methyl - 2(3H) - benzothiazolylidene)isopropylidene]-8-methyl-2(3H)-imidazo[1,2-a]pyridone

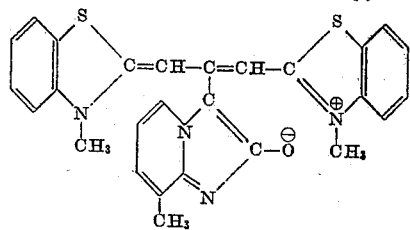

A mixture of 1.85 g. (1 mol.) of 3,3'-dimethyl-9-methyl-mercaptothiacarbocyanine p-toluenesulfonate, 1.23 g. (1 mol. plus 100% excess) of 8-methyl-2(3H)-imidazo[1,2-a]pyridone hydrochloride, 25 ml. of dry pyridine and 0.67 g. of triethylamine was heated at the refluxing temperature for 20 minutes. The cool reaction mixture was treated with cold water. After chilling, the solid was collected on a filter and washed with water. The residue was washed with ether and then extracted with benzene. The yield of dye was 92% crude and 35% after two recrystallizations from methyl alcohol. The dark-green crystals melted at 239–241° C. with decomposition and they sensitized a photographic gelatino-silver-bromoiodide emulsion with maximum sensitivity at about 640 mu.

EXAMPLE 49

6-[di(3 - ethyl - 2(3H) - benzothiazolylidene)isopropylidene]-5,7-dioxo-3-phenyl-6,7-dihydro-5-thiazolo[3,2-a]pyrimidine

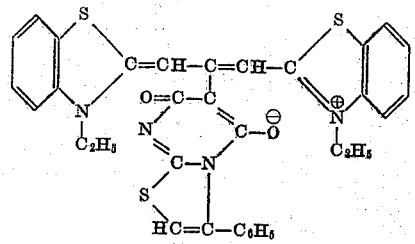

A mixture of 1.38 g. (1 mol.) of 3,3'-diethyl-9-ethyl-mercaptothiacarbocyanine iodide, 2.44 g. (1 mol. plus 300% excess) of 5,7-dioxo-3-phenyl-6,7-dihydro-5-thiazolo[3,2-a]pyrimidine, 20 ml. of dry pyridine of 0.51 g. of triethylamine was heated at the refluxing temperature for 20 minutes. The cool reaction mixture was treated with cold water. After chilling, the solid was collected on a filter and washed with water. The residue was transferred to a beaker, stirred with hot methyl alcohol, the suspension was chilled and the dye was washed on the filter with methyl alcohol. The yield of purified dye, recrystallized from n-propyl alcohol, was 7%. The brassy-green crystals melted at 234–236° C. with decomposition and they sensitized a photographic gelatino-silver-bromoiodide emulsion with maximum sensitivity at about 585 mu.

EXAMPLE 50

4-[di(3-ethyl-2(3H)-benzothiazolylidene)isopropylidene]-1-phenyl-5-pyrazolone

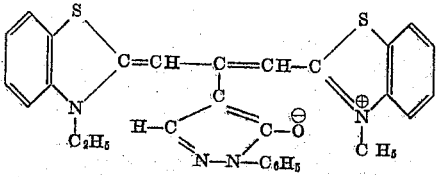

A mixture of 1.10 g. (1 mol.) of 3,3'-diethyl-9-ethyl-mercaptothiacarbocyanine iodide, 1.60 g. (1 mol. plus 400% excess) of 1-phenyl-5-pyrazolone, 15 ml. of dry pyridine and 0.40 g. of triethylamine was heated at the refluxing temperature for 20 minutes. The cool reaction mixture was treated with cold water. After chilling, the solid was collected on a filter and washed with water. The residue was transferred to a beaker, stirred with hot MeOH, the suspension was chilled and the dye washed on a filter with methyl alcohol. The yield of purified dye, recrystallized from ethyl alcohol, was 10%. The green crystals melted at 249–250° C. with decomposition and they sensitized a photographic gelatino-silver-bromoiodide emulsion with maximum sensitivity at about 600 mu.

EXAMPLE 51

3-ethyl-5-[di(3-ethyl-2(3H)-benzothiazolylidene)isopropylidene]-2-thio-2,4-oxazolidinedione

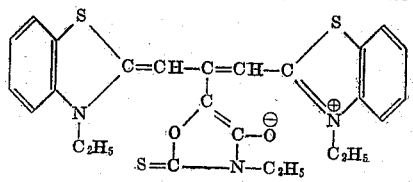

A mixture of 1.10 g. (1 mol.) of 3,3'-diethyl-9-ethyl-mercaptothiacarbocyanine iodide, 1.45 g. (1 mol. plus 400% excess) of 3-ethyl-2-thio-2,4-oxazolidinedione, 15 ml. of dry pyridine and 0.40 g. of triethylamine was heated at the refluxing temperature for 20 minutes. The cool reaction mixture was treated with cold water. After chilling, the aqueous layer was decanted, the residue was dissolved in methyl alcohol and cold water was added. Again chilled, and the aqueous layer decanted. The residue was stirred with benzene, chilled. The dye was then dissolved in a very little pyridine, the solution was filtered and methyl alcohol was added to the pyridine filtrate. The yield of purified dye was 46%. The dark-reddish crystals decomposed from about 190° C. and they sensitized a photographic gelatino-silver-bromoiodide emulsion with maximum sensitivity at about 580 mu.

EXAMPLE 52

*2-[di(3-ethyl-3(2H)-benzothiazolylidene)isopropylidene]-3(2H)-thianaphthenone*

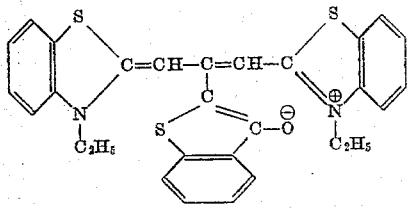

A mixture of 1.10 g. (1 mol.) of 3,3'-diethyl-9-ethylmercaptothiacarbocyanine iodide, 1.50 g. (1 mol. plus 400% excess) of 3(2H)-thianaphthenone, 15 ml. of pyridine and 0.40 g. of triethylamine was heated at the refluxing temperature for 20 minutes. The cool reaction mixture was treated with cold water. After chilling, the solid was collected on a filter and washed with water. The residue was transferred to a beaker, stirred with hot methyl alcohol, the suspension was chilled and the dye washed on a filter with methyl alcohol. The dye was dissolved in hot pyridine, the solution was filtered and hot methyl alcohol was added to the hot pyridine filtrate. After chilling, the dye was collected on a filter and washed with methyl alcohol. After another such treatment the yield of dye was 43%. The coppery mat of crystals melted at 220–222° C. with decomposition and the dye sensitized a photographic gelatino-silver-bromoiodide emulsion with maxima sensitivity at about 520 mu and 600 mu.

EXAMPLE 53

*3-ethyl-4-[di(3-ethyl-2(3H)-benzothiazolylidene)isopropylidene]-2-thio-2,5-thiazolidinedione*

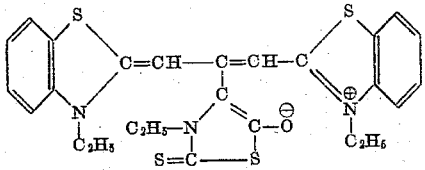

A mixture of 0.90 g. (1 mol.) of 3-ethyl-4-[(3-ethyl-2(3H)-benzothiazolylidene)isopropylidene]-2-thio-2,5-thiazolidinedione, 1.75 g. (1 mol. plus 100% excess) of 2-ethylmercaptobenzothiazole etho-ethylsulfate, 15 ml. of dry pyridine and 0.51 g. (1 mol. plus 100% excess) of triethylamine was heated at the refluxing temperature for 20 minutes. The cool reaction mixture was treated with cold water. After chilling, the solid was collected on a filter and washed with water. The residue was transferred to a beaker, stirred with hot methyl alcohol, the suspension was chilled and the dye was washed on the filter with methyl alcohol. The yield of purified dye, recrystallized from n-propyl alcohol, was 37%. The dull dark-green crystals melted at 292–294° C. with decomposition and they sensitized a photographic gelatino-silverbromoiodide emulsion with maximum sensitivity at about 580 mu.

EXAMPLE 54

*5-[di(5-chloro-3-ethyl-2(3H)-benzothiazolylidene)isopropylidene]1,3-di(β-methoxyethyl)barbituric acid*

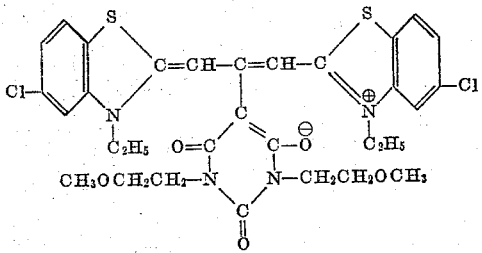

A mixture of 2.40 g. (1 mol.) of 5-[(5-chloro-3-ethyl-2(3H)-benzothiazolylidene)isopropylidene]-1,3-di(β-methoxyethyl)-barbituric acid, 3.39 g. (1 mol. plus 100% excess) of 5-chloro-2-ethylmercaptobenzothiazole ethobromide, 20 ml. of dry pyridine and 1.01 g. (1 mol. plus 100% excess) of triethylamine was heated at the refluxing temperature for 20 minutes. The cool reaction mixture was treated with cold water. After chilling, the aqueous layer was decanted, the oily layer was stirred with cold water, the aqueous layer was decanted and the residue dissolved in hot benzene. After chilling, the dye was collected on a filter and washed with benzene. The yield of dye was 2% after two recrystallizations from benzene. The purplish crystals melted at 282–283° C. with decomposition and they sensitized a photographic gelatino-silver-bromoiodide emulsion with maximum sensitivity at about 590 mu.

EXAMPLE 55

*1,3-diethyl-5-[(3-ethyl-2(3H)-benzothiazolylidene)(3-ethyl-2(3H)-benzothiazolylidene-ethylidene)isopropylidene]barbituric acid*

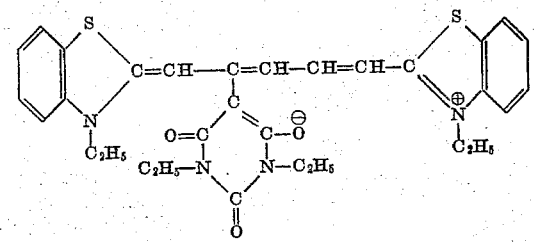

A mixture of 1.93 g. (1 mol.) of 1,3-diethyl-5-[(3-ethyl-2(3H)-benzothiazolylidene)isopropylidene] barbituric acid, 2.25 g. (1 mol.) of 2-β-acetanilidovinylbenzothiazole ethiodide, 25 ml. of nitrobenzene and 1.01 g. of triethylamine was heated at about 98° C. for 20 minutes. The cool reaction mixture was treated with methyl alcohol. After chilling and filtering, the residue was washed with a little methyl alcohol. The combined filtrate and washings were concentrated. The residue was stirred with petroleum ether. The upper layer was decanted, the sticky residue was stirred with successive portions of petroleum ether, ligroin (B. P. 90–120° C.) and water. The yield of purified dye, recrystallized from methyl alcohol, was 8%. The green crystals decomposed from about 189° C. and they sensitized a photographic gelatino-silver-bromoiodide emulsion with maximum sensitivity at about 700 mu.

EXAMPLE 56

*4-[3-ethyl-2(3H)-benzothiazolylidene)(3-ethyl-2(3H)-benzothiazolylidene-ethylidene)isopropylidene]-3-phenyl-5(4H)-isoxazolone*

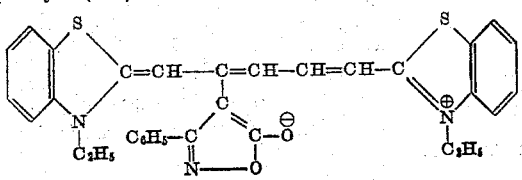

A mixture of 1.81 g. (1 mol.) of 4-[(3-ethyl-2(3H)-benzothiazolylidene)isopropylidene] - 3 - phenyl - 5(4H)-isoxazolone, 2.25 g. (1 mol.) of 2-β-acetanilidovinylbenzothiazole ethiodide, 25 ml. of nitrobenzene and 1.01 g. of triethylamine was heated at 95–100° C. for 30 minutes. A little methyl alcohol was added to the cool reaction mixture and then ether was added. After chilling, the ether-nitrobenzene-methyl alcohol layer was decanted. The residue was stirred with ether and the ether extract was added to the other liquid portion. The whole was concentrated, the residue was stirred with petroleum ether and the liquid portion was decanted, the residue was stirred with ligroin (B. P. 90–120° C.) and the ligroin layer decanted, then the residue was stirred with benzene and the benzene layer decanted, then the residue was stirred with ethylacetate and the ethylacetate layer decanted and finally the residue was dissolved in methyl alcohol. The yield of dye after another recrystallization from methyl alcohol was 1%. The dye was obtained as coppery crystals.

EXAMPLE 57

2-[(3 - ethyl-2(3H)-benzothiazolylidene)(3-ethyl-2(3H)-benzothiazolylidene - ethylidene)isopropylidene] - 1,3 - indandione

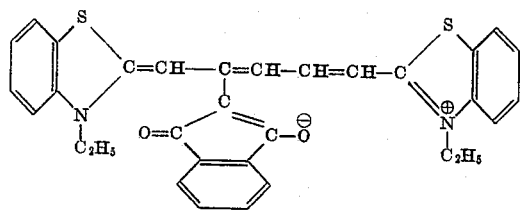

A mixture of 1.73 g. (1 mol.) of 2-[(3-ethyl-2(3H)-benzothiazolylidene)isopropylidene]-1,3-indandione, 2.25 g. (1 mol.) of 2-β-acetanilidovinylbenzothiazole ethiodide, 25 ml. of nitrobenzene and 1.01 g. of triethylamine was heated at about 95° C. for 20 minutes. A little methyl alcohol was added to the cool reaction mixture and the whole was chilled, filtered and the residue was washed with a little methyl alcohol. The combined filtrate and washings were stirred with ether. After chilling, the solid was collected on a filter. The ether-methyl alcohol-nitrobenzene filtrate was concentrated and the residue was stirred with petroleum ether. After chilling, the upper layer was decanted and the sticky residue was washed with three successive portions of ligroin (B. P. 90–120° C.). The residue was stirred with hot benzene and filtered. The residue was stirred with two portions of hot ethyl acetate. The remaining residue was stirred with hot methyl alcohol, filtered and the filtrate chilled. The dye was then recrystallized from n-propylalcohol. The green crystals melted at 271–272° C. with decomposition.

EXAMPLE 58

3-[(3-ethyl-2(3H) - benzothiazolylidene)(3-ethyl-2(3H)-benzothiazolylidene-ethylidene)isopropylidene]-2(3H)-imidazo[1,2-a]pyridone

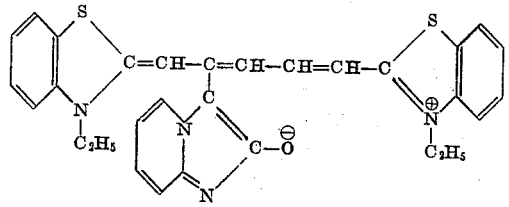

A mixture of 1.68 g. (1 mol.) of 3-[(3-ethyl-2(3H)-benzothiazolylidene)isopropylidene] - 2(3H)-imidazo[1,-2-α]pyridone, 2.25 g. (1 mol.) of 2-β-acetanilidovinyl-benzothiazole ethiodide, 25 ml. of nitrobenzene and 1.01 g. of triethylamine was heated at about 97° C. for 20 minutes. The cool reaction mixture was stirred with a little methyl alcohol and more ether. After chilling, the upper layer was decanted and the residue was washed with ether and then water. The residue was stirred with methyl alcohol, chilled and the suspension was filtered. The residue was stirred with hot benzene and the suspension was filtered hot. The residue was stirred with methyl alcohol and the suspension was filtered. The remaining residue was recrystallized from methyl alcohol. The yield of purified dye was 7%. The green crystals melted at 214–215° C. with decomposition and they sensitized a photographic gelatino-silver-bromoiodide emulsion with maximum sensitivity at about 710 mμ.

In the preparation of photographic emulsions containing our new non-ionized dyes, it is only necessary to disperse the dyes in the emulsions. The methods of incorporating dyes in emulsions are simple and well known to those skilled in the art. It is convenient to add the dyes from solutions in appropriate solvents. Methanol, pyridine, etc., alone or in admixture, have proved satisfactory as solvents for many of our new dyes. A mixture of pyridine and acetone can be used where the solubility of the dyes in methanol is lower than desired. In several instances, aside from its solubilizing effect, pyridine also has a beneficial effect on the sensitizing action of the dyes.

Sensitization by means of our dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of our dyes in the emulsion can vary widely, i. e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our dyes, the following procedure is satisfactory: A quantity of the dye is dissolved in methyl alcohol or other suitable solvent and a volume of this solution containing from 5 to 100 mgs. of dye is slowly added to about 1000 cc. of a gelatino-silver-halide emulsion, with stirring. Stirring is continued until the dye is uniformly distributed throughout the emulsion. With most of our dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

What we claim as our invention and desire to secure by Letters Patent of the United States is:

1. A non-ionized cyanine dye selected from those represented by the following general formula:

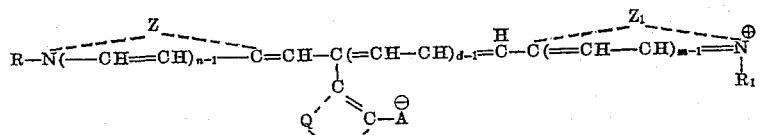

wherein R and R₁ each represents an alkyl group, Q represents the non-metallic atoms necessary to complete a heterocyclic nucleus containing from 5 to 6 atoms in the heterocyclic ring, A represents a member selected from the group consisting of an oxygen atom and a sulfur atom, $n$, $m$, and $d$ each represents a positive integer of from 1 to 2, and Z and Z₁ each represents the non-metallic atoms necessary to complete a nucleus selected from the group consisting of those of the indandione series and a heterocyclic nucleus containing from 5 to 6 atoms in the heterocyclic ring.

2. A non-ionized cyanine dye selected from those represented by the following general formula:

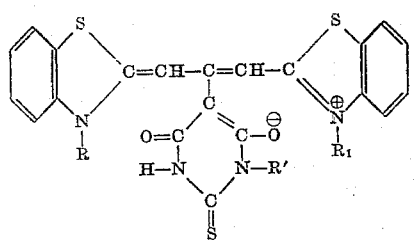

wherein R, R₁, and R' each represents an alkyl group.

3. A non-ionized cyanine dye selected from those represented by the following general formula:

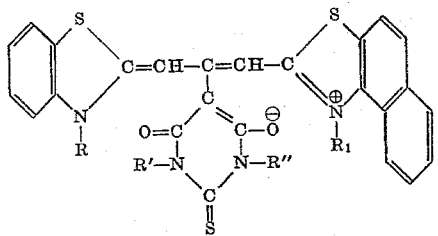

wherein R, R₁, R', and R'' each represents an alkyl group.

4. A non-ionized cyanine dye selected from those represented by the following general formula:

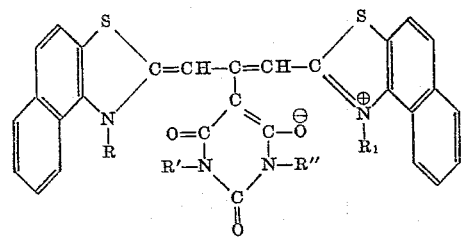

wherein R, R₁, R', and R'' each represents an alkyl group.

5. A non-ionized cyanine dye selected from those represented by the following general formula:

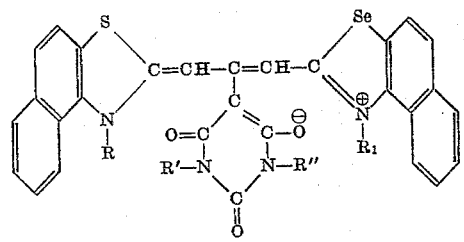

wherein R, R₁, R', and R'' each represents an alkyl group.

6. A non-ionized dye selected from those represented by the following general formula:

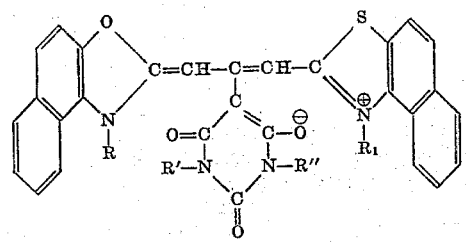

wherein R, R₁, R', and R'' each represents an alkyl group.

7. The non-ionized cyanine dye having the following formula:

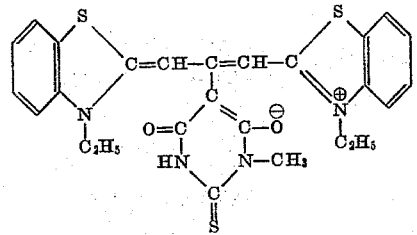

8. The non-ionized cyanine dye having the following formula:

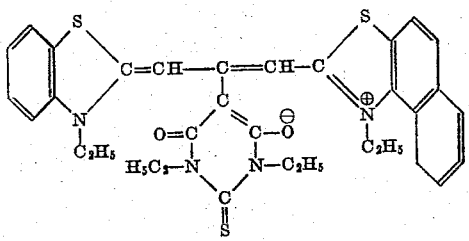

9. The non-ionized cyanine dye having the following formula:

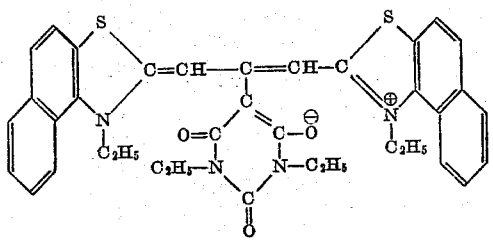

10. The non-ionized cyanine dye having the following formula:

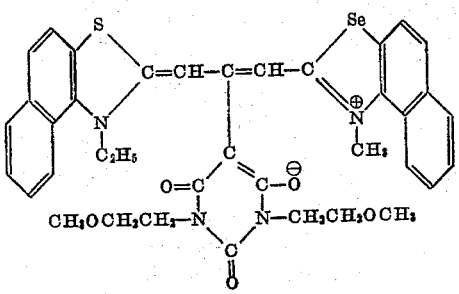

11. The non-ionized cyanine dye having the following formula:

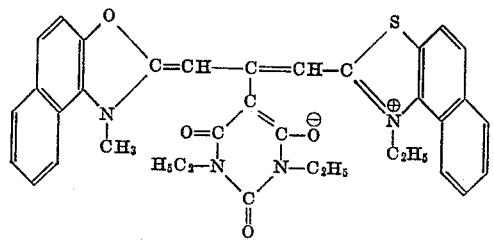

12. A process for making non-ionized cyanine dyes comprising condensing a merocarbocyanine dye selected from those represented by the following general formula:

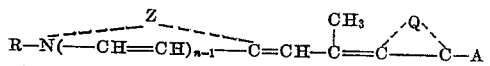

wherein R represents an alkyl group, A represents a member selected from the group consisting of an oxygen atom and a sulfur atom, $n$ represents a positive integer of from 1 to 2, and Q and Z each represents the non-metallic atoms necessary to complete a heterocyclic nucleus containing from 5 to 6 atoms in the heterocyclic ring, with a cyclammonium quaternary salt selected from those represented by the following general formula:

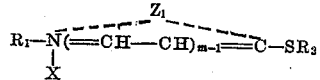

wherein $R_1$ represents an alkyl group, $R_2$ represents a member selected from the group consisting of an alkyl group and an aryl group, X represents an acid radical, $m$ represents a positive integer of from 1 to 2, and $Z_1$ represents the non-metallic atom necessary to complete a nucleus selected from the group consisting of those of the indandione series and a heterocyclic neucleus containing from 5 to 6 atoms in the heterocyclic ring.

References Cited in the file of this patent

UNITED STATES PATENTS 2,385,815      Kendall _____ Aug. 21, 1941